(12) United States Patent
Furuya et al.

(10) Patent No.: US 8,081,252 B2
(45) Date of Patent: Dec. 20, 2011

(54) IMAGE DISPLAYING APPARATUS

(75) Inventors: Shinji Furuya, Osaka (JP); Akira Yamada, Osaka (JP); Akihito Murai, Osaka (JP); Kiyoshi Kitagawa, Hyogo (JP); Yuichi Suzuki, Osaka (JP)

(73) Assignee: Panasonic Corporation, Osaka (JP)

( * ) Notice: Subject to any disclaimer, the term of this patent is extended or adjusted under 35 U.S.C. 154(b) by 343 days.

(21) Appl. No.: 11/761,496

(22) Filed: Jun. 12, 2007

(65) Prior Publication Data
US 2007/0285533 A1 Dec. 13, 2007

(30) Foreign Application Priority Data

Jun. 13, 2006 (JP) .................................. 2006-163774

(51) Int. Cl.
*H04N 5/222* (2006.01)
*H04M 1/00* (2006.01)
(52) U.S. Cl. .............. 348/333.12; 455/556.1; 455/556.2
(58) Field of Classification Search ............. 348/222.05, 348/14.07, 333.01–333.14; 48/207.99–376; 455/414.1, 416, 556.1, 556.2, 566
See application file for complete search history.

(56) References Cited

U.S. PATENT DOCUMENTS

| | | | | |
|---|---|---|---|---|
| 5,982,953 A * | 11/1999 | Yanagita et al. | ............ | 382/294 |
| 6,249,316 B1 * | 6/2001 | Anderson | ............ | 348/333.05 |
| 6,868,332 B2 * | 3/2005 | Hashimoto | ............ | 701/200 |
| 6,897,894 B1 * | 5/2005 | Miyazawa | ............ | 348/231.8 |
| 6,930,718 B2 * | 8/2005 | Parulski et al. | ............ | 348/333.11 |
| 7,123,295 B2 * | 10/2006 | Baron et al. | ............ | 348/231.2 |
| 2001/0004268 A1 * | 6/2001 | Kubo et al. | ............ | 348/333.02 |
| 2004/0244146 A1 * | 12/2004 | Park | ............ | 16/239 |
| 2005/0143124 A1 * | 6/2005 | Kennedy et al. | ............ | 455/556.1 |
| 2005/0181774 A1 * | 8/2005 | Miyata | ............ | 455/414.1 |
| 2006/0051070 A1 * | 3/2006 | Itsukaichi | ............ | 386/117 |
| 2006/0098186 A1 * | 5/2006 | Yumiki | ............ | 356/3.07 |
| 2006/0152613 A1 * | 7/2006 | Kim | ............ | 348/333.05 |
| 2006/0209191 A1 * | 9/2006 | Tsukui | ............ | 348/207.99 |

FOREIGN PATENT DOCUMENTS

JP 2006-5640 1/2006

* cited by examiner

*Primary Examiner* — Sinh Tran
*Assistant Examiner* — Mark Monk
(74) *Attorney, Agent, or Firm* — Hamre, Schumann, Mueller & Larson, P.C.

(57) ABSTRACT

The image displaying apparatus of the present invention provides a first display mode in which a first display region for one screen image is formed in a display screen, with the short side direction of the display screen aligned with the vertical direction; and a second display mode in which a first display region and a second display region for two screen images are formed in the display screen, with the long side direction of the display screen aligned with the vertical direction, and the first display region and the second display region formed such that they are arranged up and down. According to this configuration, when images are displayed in a double screen, each image can be displayed as large as possible.

22 Claims, 25 Drawing Sheets

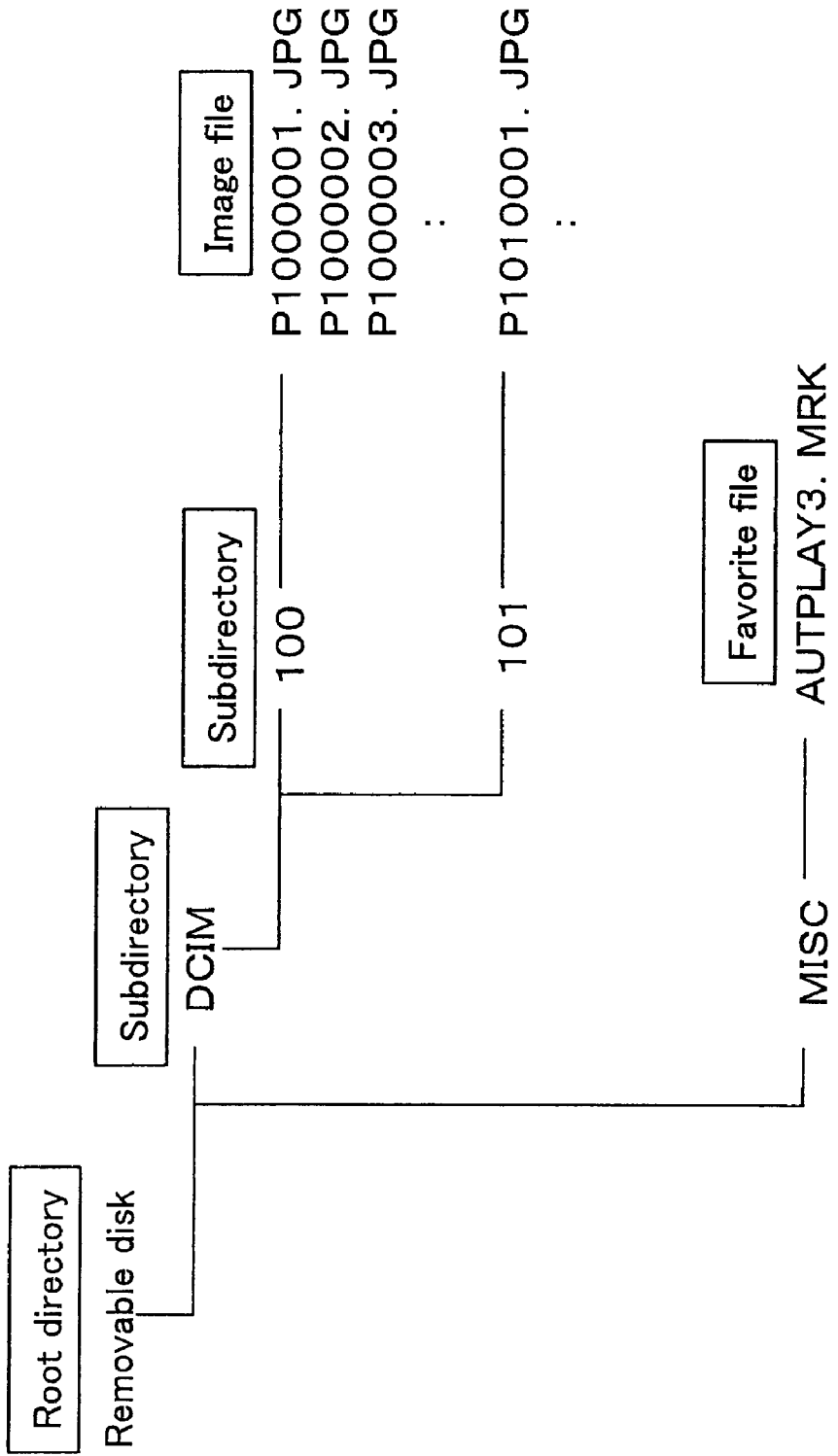
F I G. 5

《FAT management table of memory card》

| File name | Recording address |
|---|---|
| P1000001 | 0x00FFFF |
| P1000002 | 0x033122 |
| P1000004 | 0xFFFFFF |
| P1010001 | 0x0012DD |
| : | : |

FIG. 6

《FAT management table of internal memory》

| File name | Recording address |
|---|---|
| P1000002 | 0x004545 |
| P1000003 | 0xAAA633 |
| P1000004 | 0x005577 |
| P1000005 | 0x000079 |
| : | : |

FIG. 7

AUTPLAY3.MRK

[HDR]
GEN REV=01.10
GEN CRT="DMC-0000"
GEN DTM=2006:04:20:14:27:23
⎫
⎬ Header portion
⎭

[JOB]
PLY PID=001
IMG FMT=EXIF2 -J
IMG SRC="./DCIM/100/P1000001.JPG"

[JOB]
PLY PID=002
IMG FMT=EXIF2 -J
IMG SRC="./DCIM/100/P1000002.JPG"

⎫
⎬ Information of image files to which favorite parameter is set
⎭

FIG. 18

IMAGE DISPLAYING APPARATUS

BACKGROUND OF THE INVENTION

1. Field of the Invention

The present invention relates to an image displaying apparatus capable of displaying a plurality of digital images on a single display portion.

2. Description of Related Art

Digital still cameras have a liquid crystal display having a size of about 2 to 3 inches and being capable of displaying a through image during photographing or displaying an image recorded in a memory card. For such liquid crystal displays, display performance such as an increase in screen size or an increase in definition while the body of cameras is made compact is improving, and various functions that utilize the improvement of display performance are proposed. One of the functions is called a "multi-display function" as disclosed in, for example, JP 2006-5640A, whereby a plurality of images can be displayed at a time.

JP 2006-5640A discloses a configuration in which a plurality of images are multi-displayed in the display screen of a single liquid crystal display, so that similar photographed images can be compared precisely. More specifically, as shown in FIG. 3 of JP 2006-5640A, display regions for two screen images are provided on the right and left of a display screen with the short side direction of the display screen aligned with the vertical direction, and a different image is displayed in each display region.

However, when two images are displayed in the display regions arranged on the right and left of a display screen with the short side direction of the display screen aligned with the vertical direction as disclosed in JP 2006-5640A, the size of each image becomes small, and the problem arises that the visual recognition of the details of the images is difficult.

Generally, a liquid crystal display mounted in a digital still camera has an aspect ratio of 4:3 or 16:9, and is disposed in a casing such that the short side direction is aligned with the vertical direction. Also, when photographing is performed by holding the digital still camera in an upright position (a position of the digital camera in which the short side direction of the liquid display is aligned with the vertical direction), the photographed images have an aspect ratio of 4:3 or 16:9, and the short side direction of the images matches the vertical direction. If two images are displayed in the right and left of the above-described liquid crystal display while retaining the aspect ratio of the images, the size of each image becomes small.

SUMMARY OF THE INVENTION

It is an object of the present invention to provide an image displaying apparatus capable of displaying each image as large as possible when images are displayed in a double screen.

The image displaying apparatus of the present invention includes a display portion including a substantially rectangular display screen including at least two long sides opposed to each other and two short sides opposed to each other; and a control portion that controls a display operation of the display portion, wherein the control portion provides: a first display mode in which a one-screen display region for one screen image is formed in the display screen, with the short side direction of the display screen aligned with the vertical direction; and a second display mode in which a first display region and a second display region for two screen images are formed in the display screen, with the long side direction of the display screen aligned with the vertical direction, and the first display region and the second display region are formed such that they are arranged up and down.

Because the present invention can display each image as large as possible when images are displayed in a double screen, the visual recognition of the details of the images can be improved.

BRIEF DESCRIPTION OF THE DRAWINGS

FIG. 5 is a diagram showing a directory structure of a memory card.

FIG. 6 is a diagram showing a FAT management table of a memory card.

FIG. 7 is a diagram showing a FAT management table of an internal memory.

FIG. 18 is a diagram showing the content of an AUTPLAY3.MRK file.

DETAILED DESCRIPTION OF THE INVENTION

Embodiment 1

[1. Basic Configuration of Image Displaying Apparatus]

Figure 1:
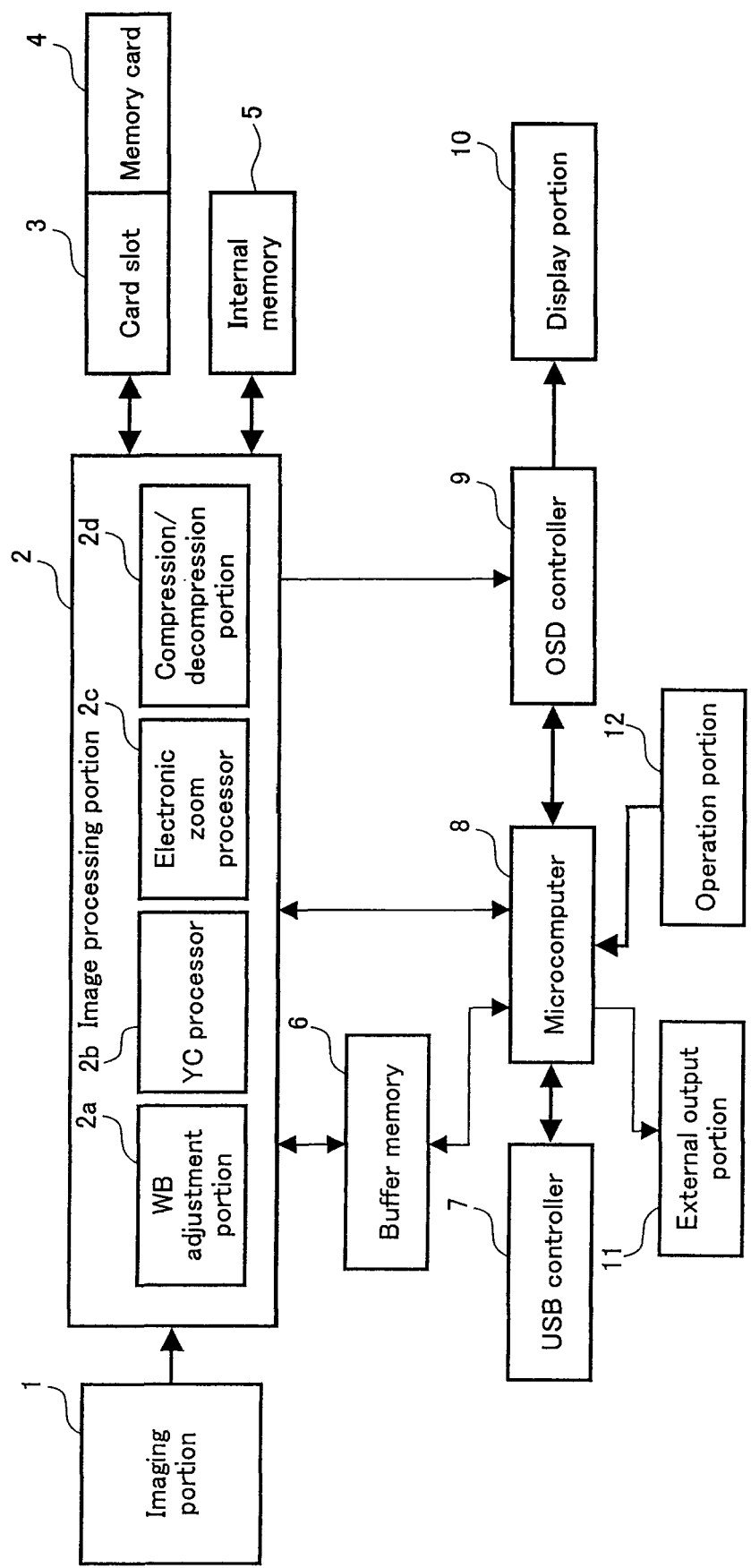
FIG. 1 is a block diagram showing the configuration of an image displaying apparatus according to Embodiment 1.

FIG. 1 is a block diagram showing the configuration of an image pickup apparatus serving as an example of the image displaying apparatus according to Embodiment 1. In the description given below, the image pickup apparatus is described as being a digital still camera capable of photographing mainly still images. Also, the image pickup apparatus according to this embodiment is capable of shooting both still images and moving images. In the following, a description focuses on the photographing/playback operation of still images. Accordingly, in the following description, a "photographing mode" refers to a still image photographing mode, and a "playback mode" refers to a still image playback mode.

The image pickup apparatus includes an imaging portion 1, an image processing portion 2, a card slot 3, an internal memory 5, a buffer memory 6, a USB controller 7, a microcomputer 8, an on-screen display (hereinafter referred to as an "OSD") controller 9, a display portion 10, an external output portion 11 and an operation portion 12.

The imaging portion 1 includes an imaging element including at least a CCD image sensor, CMOS image sensor or the like, and converts an optical image input from the object side into an electrical signal and outputs the signal. Although the details are not shown in FIG. 1, the imaging portion 1 further includes, in addition to the imaging element, a lens unit such as a focus lens or zoom lens, a diaphragm unit that restricts the amount of incident light to the imaging element, and the like.

The image processing portion 2 produces image data by performing a predetermined signal process on the electric signal output from the imaging portion 1. For example, the image processing portion 2 includes a WB adjustment portion 2a, a YC processor 2b, an electronic zoom processor 2c and a compression/decompression unit 2d.

The WB adjustment portion 2a adjusts the white balance of images. More specifically, the WB adjustment portion 2a adjusts the color of image to be close to the actual color or to be appropriate for a light source (fluorescent light, sunlight, etc).

The YC processor 2b separates an image into luminance information "Y", chrominance information "Cb" between a luminance signal and blue color, and chrominance information "Cr" between a luminance signal and red color.

The electronic zoom processor 2c performs a process in which a part of an image (e.g., the center) is trimmed to a predetermined size and the trimmed image is enlarged to have the same size as the original image by a signal process. For example, this process cuts out an image having 1024×768 dots from the center of a photographed image having 1600× 1200 dots, and enlarges the image to have a size of 1600×1200 dots by performing a data interpolation. Note that the electronic zoom processor 2c need not necessarily be present.

The compression/decompression unit 2d compresses image data in a compression format such as JPEG (Joint Photographic Expert Group) format, or decompresses compressed image data. For example, in the case of JPEG format, discrete cosine transform processing (DCT processing) is performed first in which the ratio of the high frequency component and low frequency component of image data is converted into a numerical value. Subsequently, quantization processing is performed in which the level that represents the color tone or gradation of an image is expressed in a numerical value (the number of quantized bits). Finally, the data capacity of image data is compressed in a compression format such as Huffman coding processing. More specifically, in this process, a signal character string of image data is divided into predetermined bits, and a shorter code is assigned to more frequently occurring character strings. Note that the compression/decompression unit 2d need not necessarily be present, and a method may be used in which an image is recorded without performing the compression process. Also, the compression format is not limited to JPEG format, and may be another format.

The card slot 3 (medium holding unit) is capable of removably holding a memory card 4 serving as an information medium, and has electric contact points that allow data communication with, for example, the memory card 4. Note that the card slot 3 is not limited to the above embodiment, and can be changed according to the type of the information medium used.

The memory card 4 (information medium, memory unit) is inserted removably into the card slot 3, and can record image data photographed by the image pickup apparatus. As the memory card 4, a semiconductor memory in which a semiconductor storage element such as a flash memory is included is most commonly used, but the memory card 4 also may be a card-type disk drive in which a hard disk having a small diameter is included.

The internal memory 5 is fixed inside the image pickup apparatus, and can record photographed image data. As the internal memory 5, a semiconductor memory in which a semiconductor storage element such as a flash memory is included is used most commonly, but the internal memory 5 may also be a hard disk drive.

The buffer memory 6 temporarily stores image data or the like while the signal process of image data is performed in the image processing portion 2 or the microcomputer 8.

The USB controller 7 is an interface capable of performing data communication according to the USB (Universal Serial Bus) standard, and includes a terminal removably connecting to a USB communication cable, a converter circuit that encodes the output data of the image pickup apparatus in a data format according to the USB standard and decodes the received data, and the like. The USB controller 7 can connect to a personal computer, printer or the like to perform data communication.

The microcomputer 8 (control portion) controls, in response to the operation instructions from the operation portion 12, the image processing portion 2, the buffer memory 6, the USB controller 7, the OSD controller 9 and the external output portion 11. The content of the control for each unit will be described later.

The OSD controller 9 produces an OSD signal and superimposes the OSD signal on the image data output from the image processing portion 2. The OSD signal contains various information including, for example, information on the date and time of photographing, information on the number of photographed images, and photographing mode information. The information contained in the OSD signal is expressed on the display portion 10 in the form of characters or graphics.

The display portion 10 can display an image based on the image data output from the OSD controller 9. More specifically, the display portion 10 includes a display control circuit that converts input image data into a signal capable of being displayed (e.g., the conversion into an analog image signal), a display that actually displays an image, and the like. The display is, for example, a liquid crystal display having a size of about 2 to 3 inches, but the display can be any display such as an EL (Electro-Luminescence) element as long as the display at least can display images.

The external output portion 11 is a terminal capable of outputting the image data produced in the image processing portion 2 or the image data read out from the memory card 4 or the internal memory 5 to an externally-connected display device such as a television receiver. The image data output from the external output portion 11 may be in the form of an analog signal or a digital signal.

The operation portion 12 allows various operations carried out by the user, and includes a release switch that can perform a photographing operation, a zoom switch that can perform a zooming operation, and the like. In this embodiment, at least operation buttons as shown in FIG. 2 are provided.

Figure 2:
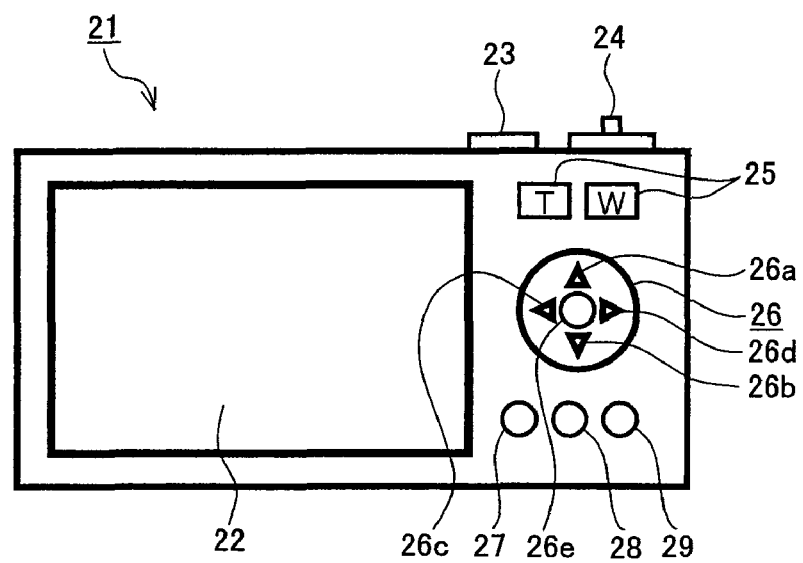
FIG. 2 is a side view of an image pickup apparatus according to Embodiment 1.

FIG. 2 is a plan view showing the back (a face that has a display portion provided thereon and is opposite to the face having a lens provided thereon) of the image pickup apparatus.

As shown in FIG. 2, a main body 21 is provided with an operation portion including a release switch 23, a mode dial 24, a zoom switch 25, a cursor button 26, a copy button 27, a mark button 28, a delete button 29, and the like. The main body 21 is provided also with a liquid crystal monitor 22, which is one type of the display portion 10. This embodiment assumes that the release switch 23 and the mode dial 24 are provided on the top face of the main body 21, and are operated with the forefinger of the user. This embodiment also assumes that the zoom switch 25, the cursor button 26, the copy button 27, the mark button 28 and the delete button 29 are provided on the back of the main body 21, and are operated with the thumb of the user. Although, in this embodiment, the copy button 27, the mark button 28 and the delete button 29 are each separate buttons, the invention is not limited to this configuration, and it is possible, for example, to assign a plurality of functions to one button, or to each button of the cursor button 26.

When the release switch 23 is depressed by the user while the image pickup apparatus is in a photographing mode, the imaging portion 1 receives the optical image captured in the imaging element and produces image data.

The mode dial 24 includes a dial capable of being rotated. With the mode dial 24, it is possible to select a normally used mode such as a photographing mode or playback mode, or to select a special photographing mode such as a close-up mode or high speed shutter mode. The photographing mode is a mode in which the optical image captured in the imaging portion 1 can be received, and the image data can be stored into the memory card 4 or the internal memory 5. The playback mode is a mode in which the image data stored in the memory card 4 or the internal memory 5 can be read out, and an image based on the image data can be displayed in the liquid crystal monitor 22.

The zoom switch 25 includes a telephoto button (the button indicated by "T" in the drawing) and a wide-angle button (the button indicated by "W" in the drawing). Upon operation of the telephoto button while the image pickup apparatus is in the photographing mode, the imaging portion 1 controls the zoom lens to move to the telephoto side. Upon operation of the wide-angle button, the imaging portion 1 controls the zoom lens to move to the wide-angle side. The microcomputer 8, upon operation of the zoom switch 25 while the image pickup apparatus is in the playback mode, performs control to partially enlarge the image data displayed in the liquid crystal monitor 22 or to change the display of the liquid crystal monitor 22 to a multi-image display (a display in which a plurality of images are displayed at a time). Although the description in this embodiment is given of an optical lens in which a zoom lens is moved to the optical axis direction in conjunction with the operation of the zoom switch 25, the operation of an electronic zoom is also possible in which a photographed image is enlarged/reduced by a signal process. Also, in this embodiment, the zoom switch 25 is a push button, but it can be a lever switch that is operable in two directions. The function assignment in the playback mode is not limited to the above.

Figure 3:
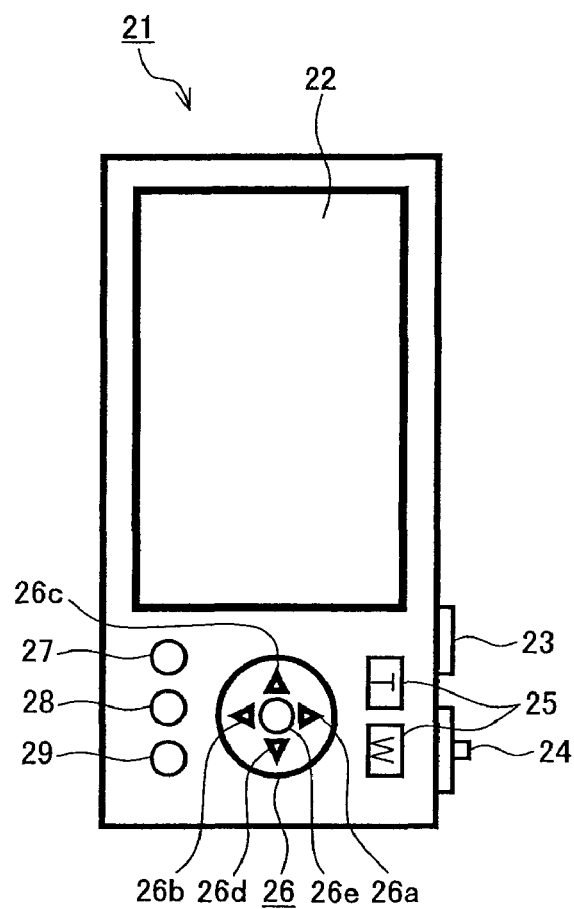
FIG. 3 is a side view of an image pickup apparatus according to Embodiment 1.

The cursor button 26 is a button that enables an operation instructing upward, downward, rightward or leftward movement in a menu screen displayed in the liquid crystal monitor 22. The cursor button 26 includes a first button 26a (first direction operation portion), a second button 26b (second direction operation portion), a third button 26c (third direction operation portion), a fourth button 26d (fourth direction operation portion) and a center button 26e. The first button 26a enables an operation instructing upward movement when, for example, the digital still camera is in an upright position (in the state shown in FIG. 2). The second button 26b enables an operation instructing downward movement. The third button 26c enables an operation instructing leftward movement. The fourth button 26d enables an operation instructing rightward movement. The center button 26e enables the display of a menu or determination of various operations. As shown in FIG. 2, the first to fourth buttons 26a to 26d are arranged at upper, lower, left and right positions, respectively, with the center button 26e in the center. In normal use, the main body 21 is used in a position in which the short side direction of the liquid crystal monitor 22 is aligned with the vertical direction as shown in FIG. 2, but it is also possible to use the main body 21 in a position that the long side direction of the liquid crystal monitor 22 is aligned with the vertical direction as shown in FIG. 3. In the state shown in FIG. 3, from the photographer's view, the first button 26a enables the operation of rightward movement, the second button 26b enables the operation of leftward movement, the third button 26c enables the operation of upward movement, the fourth button 26d enables the operation of downward movement. Upon operation of the cursor button 26 while the image pickup apparatus is in the playback mode, the image displayed in the liquid crystal monitor 22 can be changed to another image. While the image pickup apparatus is in the photographing mode, the On/Off switching of a self-timer or flash can be carried out.

Upon operation of the copy button 27 while the image pickup apparatus is in the playback mode, the microcomputer 8 performs control to copy or move the image data recorded in the memory card 4 into the internal memory 5. Also, upon operation of the copy button 27 while the image pickup apparatus is in the playback mode, the image data recorded in the internal memory 5 can be copied or moved into the memory card 4.

Upon operation of the mark button 28 while the image pickup apparatus is in the playback mode, the microcomputer 8 performs control to add a mark to desired image data in the image data recorded in the memory card 4 or the internal memory 5. Upon operation of the mark button 28 while the image pickup apparatus is in the photographing mode, the microcomputer 8 performs control to add a mark to the image data immediately after photographing. The image data to which a mark has been added can be kept as a so-called "favorite image".

Upon operation of the delete button 29 while the image pickup apparatus is in the playback mode, the microcomputer 8 performs control to delete a selected image file of the image files stored in the memory card 4 or the internal memory 5.

[2. Operation of Image Displaying Apparatus]
[2-1. Capture Operation]

In FIG. 1, when the image pickup apparatus is started by turning on the power source, an optical image input via a lens or the like is formed in the imaging portion 1. The imaging portion 1 converts the input optical image into an electrical signal and outputs the electrical signal to the image processing portion 2. The image processing portion 2 produces an image signal based on the input electrical signal, and the image signal is transferred to the WB adjustment portion 2a where the image is adjusted to have an appropriate brightness and color.

Subsequently, in the YC processor 2b, the image signal is divided into a luminance signal Y and chrominance signals Cr and Cb, and a process is performed to reduce the amount of information on the chrominance signals Cr and Cb. As the process for reducing the amount of information on the chrominance signals Cr and Cb, for example, a "4:2:2 downsampling process" in which the color information in the main scanning direction of an image is thinning out, a "4:1:1 downsampling process" in which the color information in the vertical and horizontal directions of an image is thinning out, or the like can be performed.

The image data processed in the image processing portion 2 is input to the OSD controller 9 where an OSD image is superimposed. The OSD image is an image including various information, such as current date and time, the date and time of photographing and the photographing mode, which is expressed in the form of characters and graphics, and specifically, the OSD image refers to a sign 34 indicating the amount of remaining battery power and information 35 on the number of images in FIG. 10A, for example.

The image based on the image data output from the OSD controller 9 is displayed in the display portion 10. The image displayed in the display portion 10 at this time is an image (a so-called "through image") before a compression process is performed.

While a through image is displayed in the display portion 10, when the photographer operates the release switch 23 (see FIG. 2) of the operation portion 12, the microcomputer 8 controls the image processing portion 2 to perform a compression process for the image data in the compression/decompression unit 2d. More specifically, discrete cosine transform processing in which the ratio of the high frequency component and low frequency component of image data is converted into a numerical value, quantization processing in which the level that represents the color tone or gradation of an image is expressed in the number of quantized bits, Huffman coding processing in which a signal character string of image data is divided into predetermined bits, and a shorter code is assigned to more frequently occurring character strings, and the like are executed.

An OSD signal is superimposed onto the image data compressed in the compression/decompression unit 2d in the OSD controller 9. The image based on the image data output from the OSD controller 9 is displayed in the display portion 10. The image data compressed in the compression/decompression unit 2d is recorded into the memory card 4 via the card slot 3 or into the internal memory 5. The user can set either one of the memory card 4 and the internal memory 5 freely to record the image.

At the time of photographing, the zoom switch 25 is operated before the operation of the release switch 23, whereby it is possible to enlarge or reduce the image. More specifically, by operating the zoom switch 25, an optical zoom or electronic zoom can be performed. The optical zoom is a zoom method in which a zoom lens included in the imaging portion 1 is moved along the optical axis direction to optically enlarge or reduce an optical image. The electronic zoom is a zoom method in which a part of an image (normally the center) is trimmed in the electronic zoom processor 2c and the image is enlarged or reduced by performing a pixel interpolation.

The recording operation of image data to the memory card 4 or the internal memory 5 now will be described in detail.

First, a file name is added to the image data to be recorded in the memory card 4 or the like. The file name is managed by a file management table recorded in the memory card 4 or the like. The writing or rewriting of information into the file management table is performed by the microcomputer 8.

Figure 4:
FIG. 4 is a diagram showing a file management table for image files.

FIG. 4 shows an example of the file management table. As shown in FIG. 4, the file management table includes a file number consisting of four alphanumeric characters, a directory number consisting of three alphanumeric characters, and management information such as with or without protection and with or without favorite parameters. There is actually other information to be managed than that shown in FIG. 4, but a description thereof is omitted here.

The file number is a number added to individual image data, and generally consists of alphanumeric characters in a successive recording order. In the example shown in 4, successive file numbers are added for a directory number. For example, in the directory number "100", file numbers are added in the order of "0001", "0002", "0003" and so on. In the directory number "101", file numbers are added starting with "0001"

When adding a file name, a common alphabet in the file is added as the first character of the file name, the directory number consisting of three characters is then added, and the file number consisting of four characters is then added to obtain a name consisting of eight characters in total. For example, in the case of the file name shown on the first line in FIG. 4, the first character is "P", the subsequent 2 to 4 characters represent the directory number "100", and the subsequent 5 to 8 characters represent the file number "0001", and finally the file name "P1000001" is obtained. To the name obtained as above, an extension such as ".JPG" is added to complete the file name.

FIG. 5 shows a directory configuration of the memory card 4. When the content recorded in the memory card 4 is opened in a personal computer or the like, the files and folders are managed by a directory configuration as shown in FIG. 5 based on the file management table.

As shown in FIG. 5, the root directory is a "removable disk", which refers to the memory card 4. The "removable disk" contains subdirectories named "DCIM" and "MISC". The DCIM directory contains subdirectories "100", "101" and so on. The name of this subdirectory corresponds to the directory number in FIG. 4. Each subdirectory stores image files to which have been added the file names produced based on the file management table shown in FIG. 4. The MISC directory stores "AUTPLAY3.MRK" file in which favorite parameter information is stored. The "favorite parameter" will be described later.

Subsequently, when storing image files in the memory card 4 or the like, a recording address is assigned to each image file before the recording operation of the image file is performed. FIG. 6 shows a FAT management table of the memory card 4. As shown in FIG. 6, in the FAT management table, a recording address is assigned corresponding to each file name. The recording addresses in the table represent sector or cluster addresses in the recording region of the memory card 4. Further, the FAT management table is recorded in the memory card 4, and the writing and rewriting of information is performed by the microcomputer 8.

Figure 8:
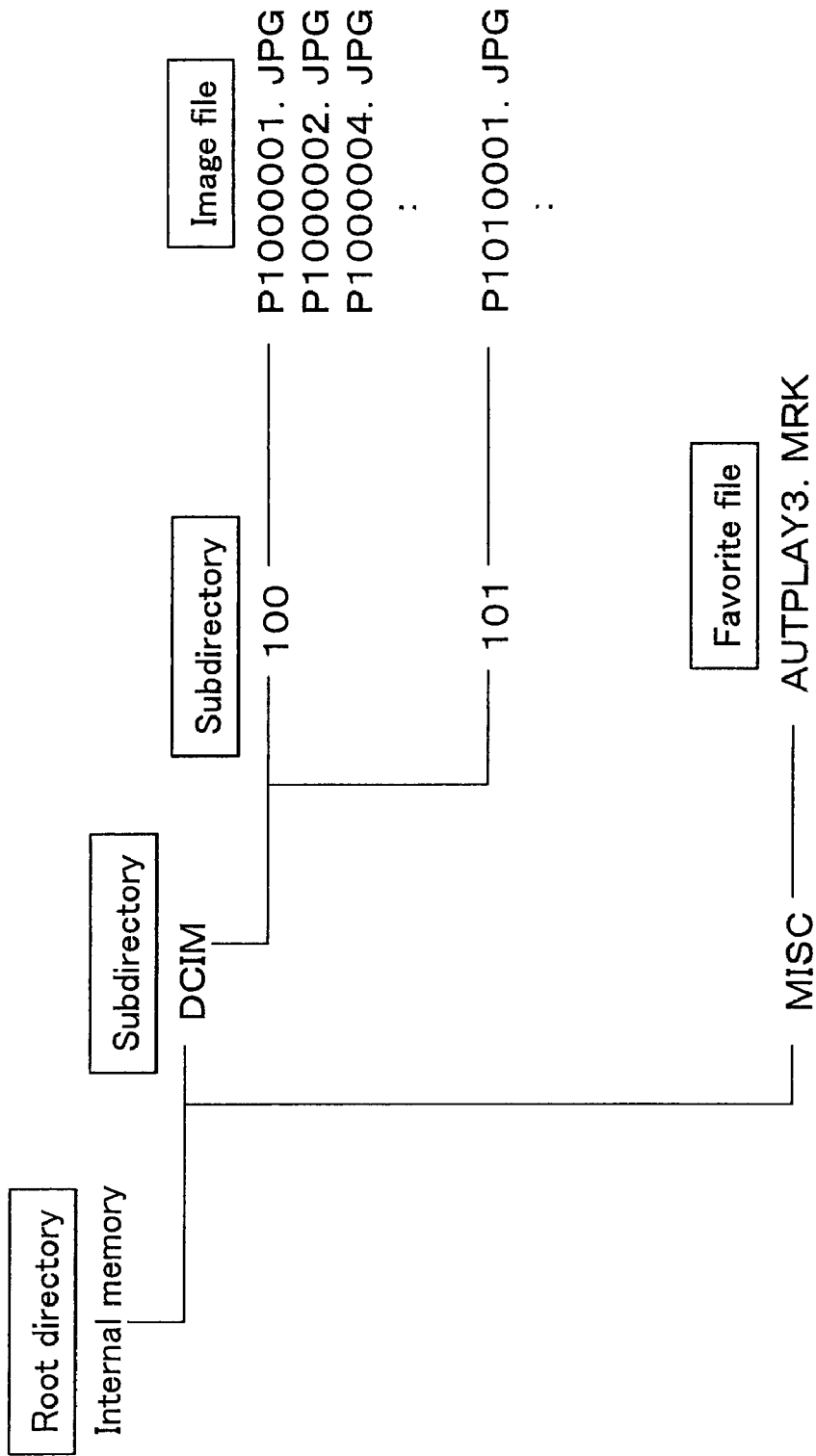
FIG. 8 is a diagram showing a directory structure of an internal memory.

As for the file management table, FAT management table (see FIG. 7), and directory configuration (see FIG. 8) of the internal memory 5, because they are essentially the same as those of the memory card 4 described above, a description thereof is omitted here.

[2-2. Playback Operation]

When the mode is changed from the photographing mode to the playback mode, the mode dial 24 is operated to select the playback mode. Upon selection of the playback mode, the file management table (see FIG. 4) and FAT management table (see FIG. 6) recorded in the memory card 4 or the internal memory 5 are read out and then stored temporarily in the buffer memory 6. In the following description, the operation for playing back the image file stored in the memory card 4 will be described as an example.

When the user selects a desired image file by operating the operation portion 12, the microcomputer 8 accesses the FAT management table stored in the buffer memory 6, and confirms the recording address of the image file selected by the operation portion 12. Subsequently, based on the recording address, the microcomputer 8 accesses to a proper address in the memory card 4 and reads out the image file.

Figure 9:
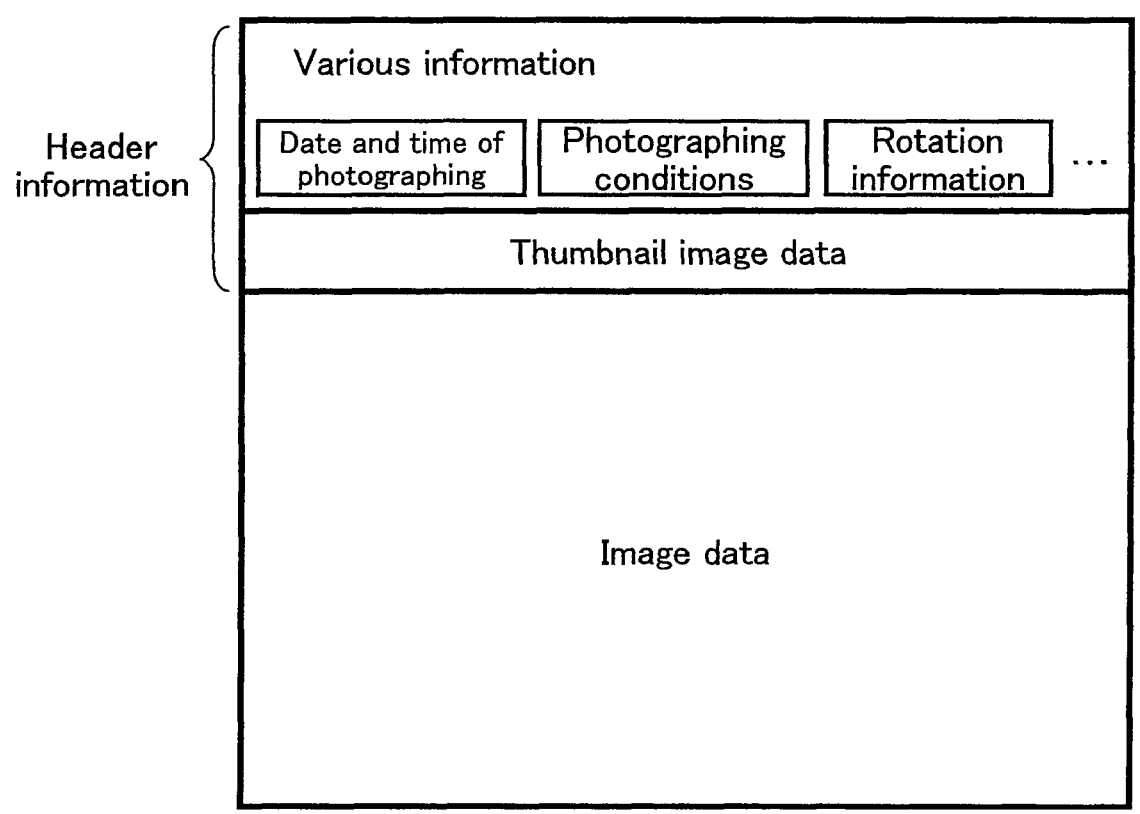
FIG. 9 is a diagram showing the structure of an image file.

The image file recorded in the memory card 4 includes header information and image data as shown in FIG. 9. The header information includes various information containing information on the date and time of photographing, information on photographing conditions such as shutter speed and diaphragm opening, and rotation information of the image (the details will be described later), and information on thumbnail image (a reduced image used in an image list or the like).

The header information of the image file read out from the memory card 4 is stored temporarily in the buffer memory 6 and is read out from the microcomputer 8 as appropriate. The read-out header information is used, for example, for the production of the OSD signal.

Further, the image data of the image file read out from the memory card 4 is decompressed into the image data before being compressed in the compression/decompression unit 2d of the image processing portion 2. The decompressed image data is output to the OSD controller 9. The OSD controller 9 produces, based on the header information of the read-out image file, an OSD signal containing the date and time of photographing and information on photographing conditions (shutter speed, etc.) expressed in the form of characters and graphics. The OSD controller 9 superimposes the produced OSD signal on the image data, and outputs it to the display portion 10. The display portion 10 displays an image based on the input image data.

Subsequently, another image can be displayed by the operation of the third button 26c or the fourth button 26d of the cursor key 26 carried out by the user. Upon operation of the third button 26c or the fourth button 26d, the microcomputer 8 accesses the FAT management table stored in the buffer memory 6. Thereafter, in the same manner as described above, the micron 8 confirms the recording address of the selected image file, and reads out the image file from the memory card 4 based on the recording address. The header information of the read-out image file is stored in the buffer memory 6, and the image data is decompressed in the same manner as described above. An OSD signal is superimposed onto the decompressed image data, and an image based on the image data is displayed in the display portion 10.

[2-3. Communication Operation]

With reference to FIG. 1, a description will be given of an operation for outputting the image file recorded in the memory card 4 to an external device (a personal computer, printer, etc.) via USB communication.

First, a USB driver software is assumed to be installed in the image pickup apparatus and an external device. When the image pickup apparatus and the external device are connected by a USB cable, an authentication operation is performed between the image pickup apparatus and the external device, confirming a condition that allows data communication with each other.

When the external device is a personal computer, with the operation of the personal computer, the image file stored in the memory card 4 can be read out to the personal computer, or the image file stored in the hard disk of the personal computer can be written into the memory card 4.

When the external device is a printer, with the operation of the operation portion 12 of the image pickup apparatus, an image file that the user wants to print out is selected, and at the same time, a print command is input. Subsequently, a control signal serving as the print command is transferred to the printer. The printer acquires an image file to be printed out from the memory card 4 based on the input control signal, and thereby it can print out the image data of the acquired image file.

[2-4. Display Operation]

The image pickup apparatus has, as shown in FIG. 2, a rectangular liquid crystal monitor 22 having an aspect ratio of 4:3 or 16:9 disposed such that the short side direction is aligned with the vertical direction in the apparatus being held in an upright position. Generally, photographing and image playback are performed in an upright position as shown in FIG. 2. The images photographed in an upright position as shown in FIG. 2 are rectangular images with the short side direction being matched with the vertical direction.

However, it is also possible to perform photographing and image playback with the image pickup apparatus being held in a position in which the long side direction of the liquid crystal monitor 22 is aligned with the vertical direction as shown in FIG. 3.

Referring to FIG. 1, when a photographed image is displayed in the display portion 10, based on the playback command from the operation portion 12, the microcomputer 8 controls the image processing portion 2 to read out an image file from the memory card 4 or the internal memory 5. The header information of the image file read out from the memory card 4 or the internal memory 5 is stored in the buffer memory 6, and the image data is image-processed in the image processing portion 2. The microcomputer 8 performs control to output the image data output from the image processing portion 2 to the OSD controller 9. The OSD controller 9 superimposes an OSD signal on the input image data and then outputs the input image data to the display portion 10. The display portion 10 displays an image based on the input image data.

Figure 10A:
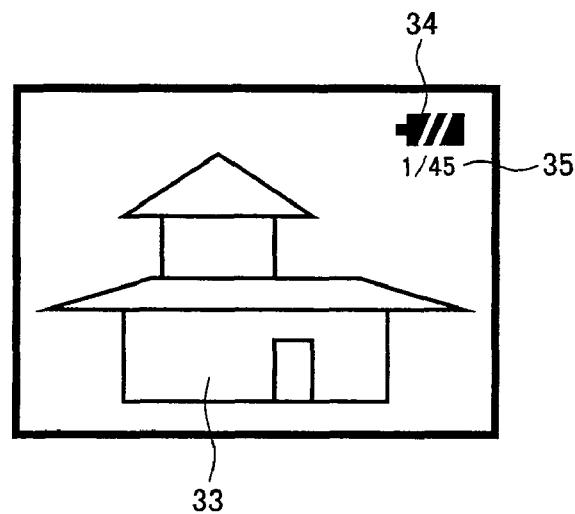
FIGS. 10A to 10C are schematic diagrams illustrating a display state in a first display mode and a second display mode.
Figure 10B:
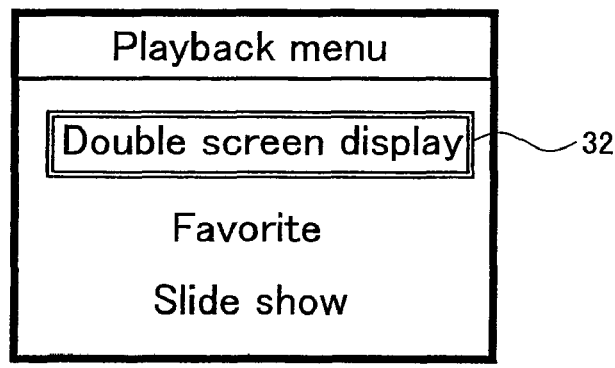
Figure 10C:
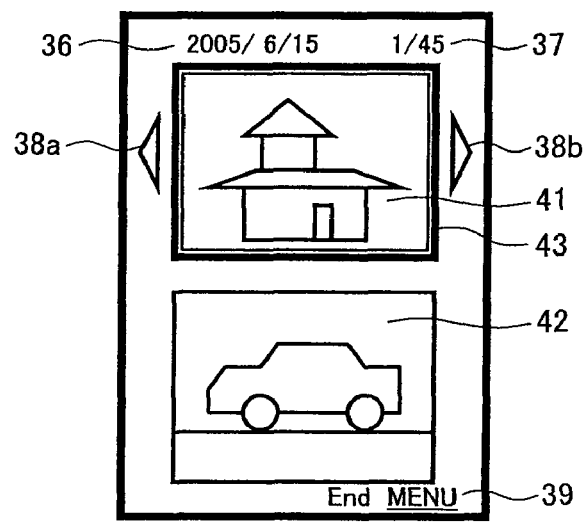

FIG. 10 shows the content displayed in the liquid crystal monitor 22. FIG. 10A shows a state in which the liquid crystal monitor 22 is held such that the short side direction of the liquid crystal monitor 22 is aligned with the vertical direction, and an image whose short side direction serves as the vertical direction is displayed. In FIG. 10A, the region in which the image is displayed is referred to as a "one-screen display region". FIG. 10B shows a state in which a menu screen is displayed. FIG. 10C shows a state in which the liquid crystal monitor 22 is held such that the long side direction of the liquid crystal monitor 22 is aligned with the vertical direction, and images are displayed in a double screen. In the following description, the display mode shown in FIG. 10A and FIG.

10B is referred to as a "first display mode". The display mode shown in FIG. 10C is referred to as a "second display mode".

[2-4-1. Operation of Double Screen Display]

The "double screen display" refers to a display method in which two images are displayed simultaneously in a single display screen. In order to perform the double screen display in the image pickup apparatus of this embodiment, first, as shown in FIG. 10A, a horizontally long image 33 is displayed on the liquid crystal monitor 22 (see FIG. 2) being held with the short side direction aligned with the vertical direction, and the center button 26e (see FIG. 2) is operated. Upon operation of the center button 26e, a playback menu as shown in FIG. 10B is displayed. With the playback menu shown in FIG. 10B, various functions in the playback mode can be set, including the settings for double screen display, the settings for slide show in which images are successively displayed with a predetermined time interval, and the settings for the favorite function in which the user can add a mark to a specific image. Besides the playback menu, it is also possible to display a photographing menu in which functions regarding photographing can be set, an initial setting menu in which the settings for internal clock of the image pickup apparatus can be set, or the like, but a description thereof is omitted.

In the playback menu shown in FIG. 10B, by operating the first button 26a or the second button 26b shown in FIG. 2, the cursor 32 in FIG. 10B can be moved in the upward direction or downward direction to select an intended function. After the selection, by operating the center button 26e, the function selected by the cursor 32 can be started. In order to start the double screen display function, the cursor 32 is moved to "double screen display" in the playback menu, after which the center button 26e is operated, whereby it is possible to bring the liquid crystal monitor 22 into the second display mode as shown in FIG. 10C.

As shown in FIG. 10C, when the liquid crystal monitor 22 is in the second display mode, a first image 41 and a second image 42 are displayed such that they are arranged along the long side direction of the liquid crystal monitor 22 with the long side direction aligned with the vertical direction. The displayed first image 41 and second image 42 are displayed such that the short side direction is aligned with the vertical direction. In other words, the images are displayed horizontally in the vertically long screen. The images shown in FIG. 10C have the same aspect ratio as that of the image shown in FIG. 10A. Note that the region in which the first image 41 is displayed is referred to as a "first image display region", and the region in which the second image 42 is displayed is referred to as a "second image display region". Immediately after switching to the second display mode, the first image display region displays the image displayed before the mode is switched, and the second image display region displays the next image in the arrangement order of image files (e.g., in ascending order of file names). In the example shown in 10C, as the sign 37 indicating the number of images shows, the first image 41 is the first of 45 images, and the second image 42 is the second of 45 images. As shown in FIG. 10C, information 36 on the date and time of photographing is also displayed.

In FIGS. 10A to 10C, the signs 35 and 37 indicating the number of images, and the sign 36 indicating the date and time of photographing and the like are images displayed based on the OSD signal produced in the OSD controller 9 shown in FIG. 1. The display direction of the images based on the OSD signal is controlled in synchronization with the display direction of the liquid crystal monitor 22. More specifically, in the first display mode shown in FIG. 10A or 10B, the displayed OSD images (the sign 34 indicating the amount of remaining battery power, the sign 35 indicating the number of images, the menu screen, etc.) are controlled to be displayed such that the short side direction of the liquid crystal monitor 22 is aligned with the vertical direction. In the second display mode shown in FIG. 10C, the OSD images (the sign 36 indicating the date and time of photographing, the sign 37 indicating the number of photographed images, etc.) are controlled to be displayed such that the long side direction of the liquid crystal monitor 22 is aligned with the vertical direction.

In the mode shown in FIG. 10C, when visually checking images displayed in the liquid crystal monitor 22 or performing various operations, the image pickup apparatus is held such that the long side direction of the liquid crystal monitor 22 is aligned with the vertical direction as shown in FIG. 3. At this time, in the cursor key 26, the first button 26a enables an operation instructing rightward movement. The second button 26b enables an operation instructing leftward movement. The third button 26c enables an operation instructing upward movement. The fourth button 26d enables an operation instructing downward movement. Accordingly, in the second display mode, by using the image pickup apparatus in the position shown in FIG. 3, the images displayed in a double screen in the liquid crystal monitor 22 can be easily visually recognized. Further, because the operation direction of the cursor key 26 can be matched with the display direction of the liquid crystal monitor 22, the operability can be improved.

In FIG. 10C, the first image 41 is surrounded by a solid frame 43. This indicates that the first image 41 is activated. "Activated" means that the image serves as an object to be operated when the operation portion 12 such as the cursor key 26 is operated. For example, by operating the first button 26a or the second button 26b of the cursor key 26 while the first image 41 is activated as shown in FIG. 10C, the first image 41 displayed in the first image display region can be switched to another image.

The marks 38a and 38b are marks that indicate the switching direction of images and guide the user to operate the first button 26a or the second button 26b.

Further, the information 36 on the date and time of photographing, the sign 37 indicating the number of images, the marks 38a and 38b, the solid frame 43 that indicates the activated condition, and the mark 39 that guides to end operation are indicated by the OSD signal produced by the OSD controller 9.

In the second display mode shown in FIG. 10C, by operating the center button 26e, the second display mode can be switched to the first display mode shown in FIG. 10A.

[2-4-2. Operation for Switching Display in Second Display Mode]

First, image files are assumed to be recorded in the memory card 4 or the internal memory 5. The image files are recorded in the order of the date and time of photographing, and each image is defined as "Image A", "Image B", "Image C" and so on according to that order. Further, another assumption is made that the mode is switched to the second display mode while Image A is being displayed in the first display mode (see FIG. 10A). In the second display mode, the image pickup apparatus is used in the position shown in FIG. 3.

Figure 11A:
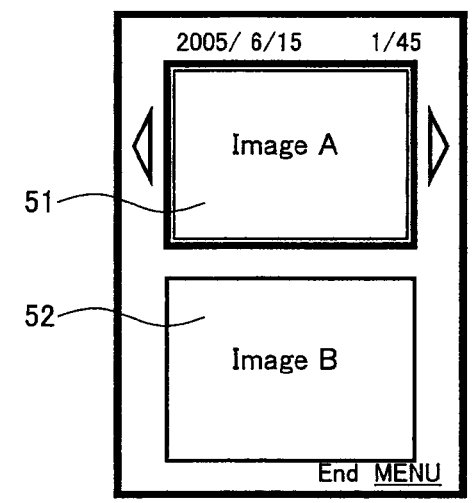
FIGS. 11A to 11C are schematic diagrams illustrating a display state in a second display mode.
Figure 11B:
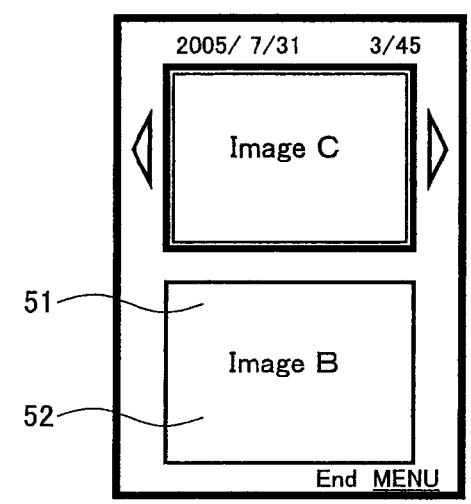
Figure 11C:
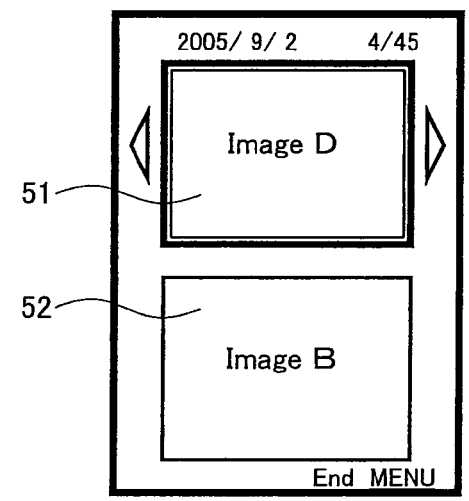

FIGS. 11A to 11C show display states in the second display mode. Because the second display mode assumes that the image pickup apparatus is used in the position shown in FIG. 3 as described previously, the images and various information are displayed appropriately in the state in which the longitudinal direction of the liquid crystal monitor is aligned with the vertical direction as shown in FIGS. 11A to 11C.

As shown in FIG. 11A, when the image pickup apparatus is switched into the second display mode, the microcomputer 8 performs control to display Image A in the first image display region 51 and to display Image B in the second image display region 52. At this time, Image A displayed in the first image display region 51 is activated. Upon operation of the first button 26a in FIG. 3 while the images are being displayed as shown in FIG. 11A, the microcomputer 8 performs control to display Image C in the first image display region 51 as shown in FIG. 11B.

Further, in the state shown in FIG. 11B, when the first button 26a in FIG. 3 is operated, the microcomputer 8 performs control to display Image D in the first image display region 51 as shown in FIG. 11C. When the state is switched from the state shown in FIG. 11A to that shown in FIG. 11B, and when the state is switched from the state shown in FIG. 11B to that shown in FIG. 11C, because the second image display region 52 is not activated, Image B stays displayed.

When switching the image displayed in the activated image display region to another image, the display is controlled to skip the image displayed in the deactivated image display region. For example, as shown in FIG. 11A, in the case where Image A, which is the first of 45 images, is displayed in the activated first image display region 51 and Image B, which is the second image, is displayed in the deactivated second image display region 52, when a forward operation is performed for the first image display region 51, the first image display region 51 skips Image B, which is the second image, and displays Image C, which is the third image, as shown in FIG. 11B. As described, when switching the image displayed in the activated image display region to another image, the switching is performed such that the image displayed in the deactivated image display region is skipped, and thus the same image is not displayed in both image display regions, and the displayed image can be switched rapidly. Therefore, the operability for displaying images can be improved.

Also, by operating the second button 26b in the state shown in FIG. 11C, the display can be switched to the state shown in FIG. 11B or 11A.

[2-4-3. Operation for Switching Display in Second Image Display Region 52]

A description will now be given of an operation for switching the image displayed in the second image display region 52 to another image.

Figure 12A:
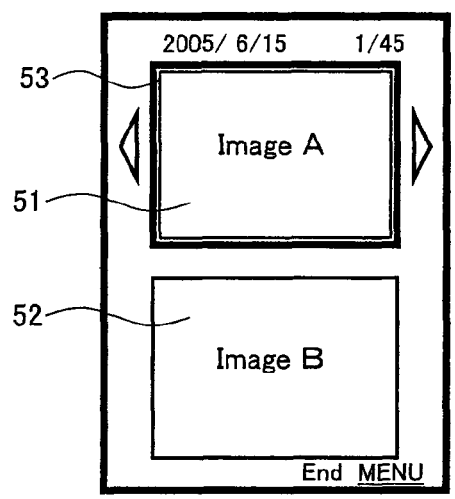
FIGS. 12A to 12C are schematic diagrams illustrating a display state in a second display mode.

In FIG. 12A, Image A is displayed in the first image display region 51, Image B is displayed in the second image display region 52, and the first image display region 51 is activated. Upon operation of the fourth button 26d in FIG. 3 in the display state shown in FIG. 12A, the microcomputer 8 performs control to move the solid frame 53 to the second image display region 52 as shown in FIG. 12B so as to activate the second image display region 52.

Figure 12B:
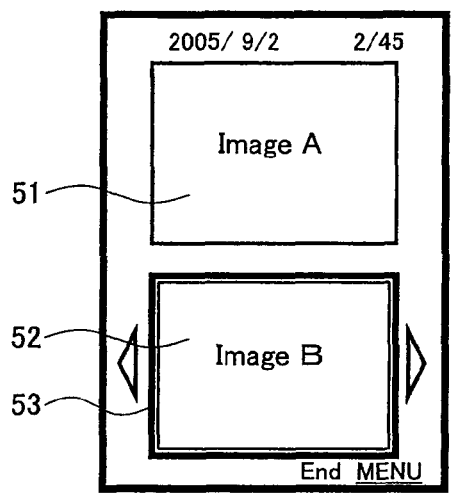
Figure 12C:
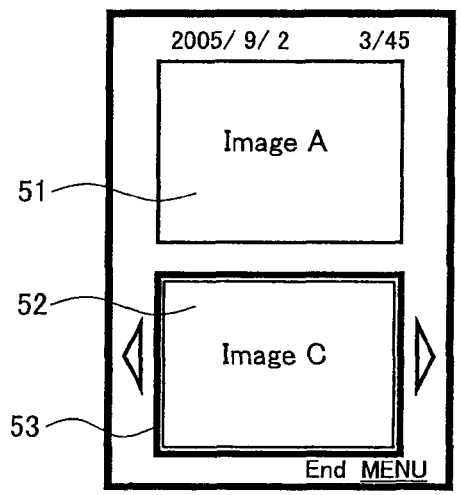

Upon operation of the first button 26a in FIG. 3 in the display state shown in FIG. 12B, the microcomputer 8 performs control to display Image C in the second image display region 52 as shown in FIG. 12C. When the state is switched from the state shown in FIG. 12B to that shown in FIG. 12C, because the first image display region 51 is not activated, Image A stays displayed.

Further, upon operation of the second button 26b in FIG. 3 in the display state shown in FIG. 12C, the microcomputer 8 performs control to change Image C displayed in the second image display region 52 back to Image B as shown in FIG. 12B. Also, upon operation of the third button 26c in the state shown in FIG. 12B or 12C, the microcomputer 8 performs control to move the solid frame 53 from the second image display region 52 to the first image display region 51 so as to activate the image displayed in the first image display region 51.

In the manner as described, page forwarding can be performed separately for the images displayed in the first image display region 51 and the second image display region 52.

[2-4-4. Method for Comparing Images]

Figure 13A:
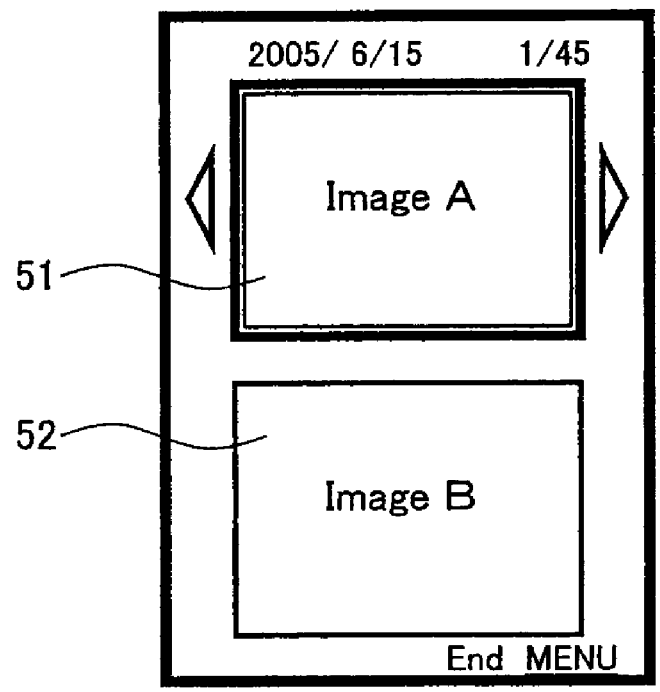
FIGS. 13A to 13B are schematic diagrams illustrating a display state in a second display mode.
Figure 13B:
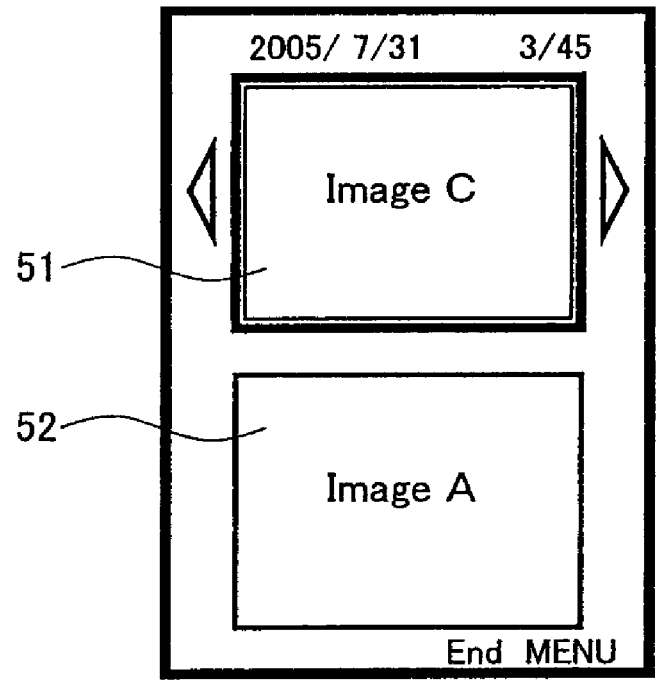

In FIG. 13A, Image A is displayed in the first image display region 51, Image B is displayed in the second image display region 52, and the first image display region 51 is activated. In FIG. 13A, by performing a predetermined operation (e.g., by operating the center button 26e in FIG. 3), the microcomputer 8 performs control to display Image C in the first image display region 51 as shown in FIG. 13B and to display Image A in the second image display region 52. In other words, Image A is moved from the first image display region 51 to the second image display region 52. By displaying the images like this, Image A can be compared to another image.

For example, in the state shown in FIG. 13B, a comparison between Image A and Image C can be made. When comparing Image A to another image, by operating the first button 26a in FIG. 3, the image displayed in the first image display region 51 can be switched to Image D, Image E and so on. Thereby, a comparison between Image A and Image D, or a comparison between Image A and Image E can be made.

[2-4-5. Display Operation when Deleting Image]

A description will now be given of an operation for deleting image files. The operation of deleting image files can be performed by the delete button 29 shown in FIG. 3.

Figure 14A:
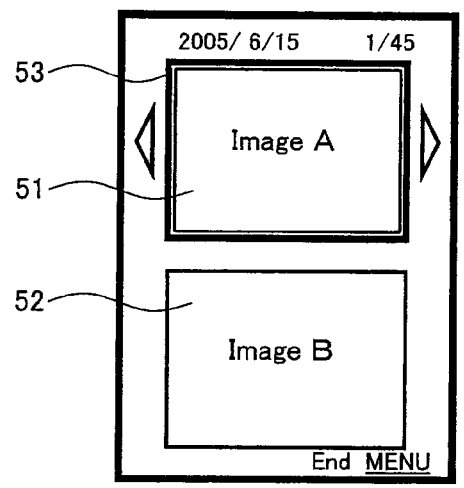
FIGS. 14A to 14C are schematic diagrams illustrating a display state in a second display mode.
Figure 14B:
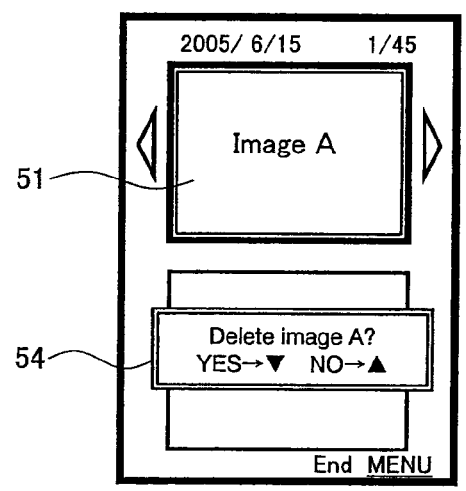

In FIG. 14A, Image A is displayed in the first image display region 51, Image B is displayed in the second image display region 52, and the first image display region 51 is activated. Upon operation of the delete button 29 in FIG. 3 in the display state of FIG. 14A, the microcomputer 8 performs control to display a message 54 asking whether or not to delete the image displayed in the activated image display region as shown in FIG. 14B. In the example shown in 14, because the first image display region 51 is activated, Image A is an object to be deleted. Accordingly, a message 54 as shown in FIG. 14B is displayed.

Figure 14C:
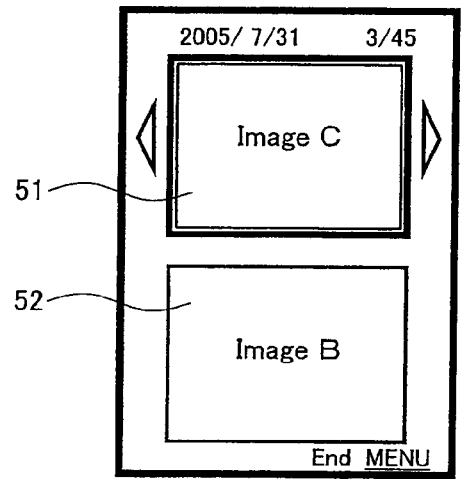

Upon operation of the third button 26c in the state shown in FIG. 14B, the microcomputer 8 performs control to remove the message 54 and to restore the display shown in FIG. 14A. Upon operation of the fourth button 26d, the microcomputer 8 performs control to remove the message 54 and to display Image C in the first image display region 51 as shown in FIG. 14C. The microcomputer 8 also deletes the image file of Image A recorded in the memory card 4 or the internal memory 5. When the image file of Image A is deleted, normally, Image B is displayed in the first image display region 51, but in FIG. 14, because Image B is already displayed in the second image display region 52, Image C, which is the image next to Image B, is displayed in the first image display region 51.

According to this embodiment, the message 54 is displayed such that it does not overlap the image that serves as an object to be deleted (Image A in the case of FIG. 14), and therefore the user can determine whether or not to delete the image after visually checking the entire image that serves as an object to be deleted.

[2-4-6. Operation for Displaying Image of Memory Card 4 and Internal Memory 5]

Figure 15A:
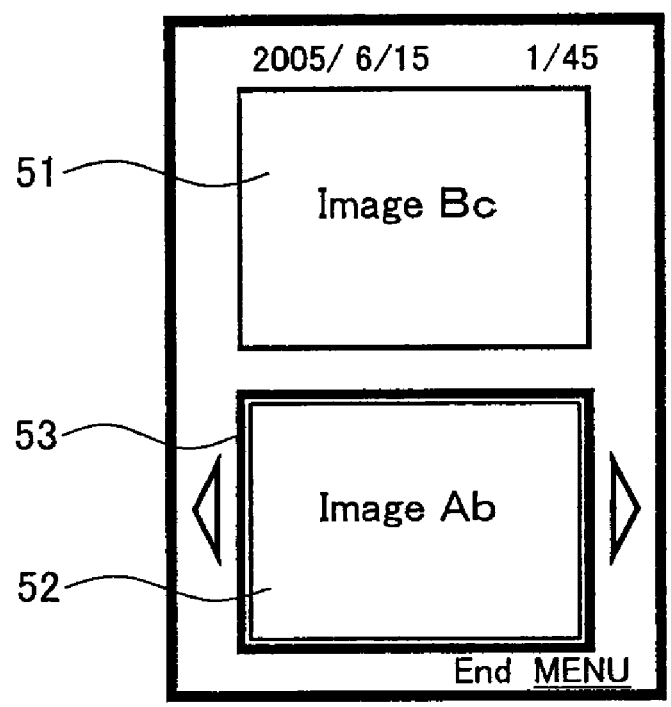
FIGS. 15A to 15B are schematic diagrams illustrating a display state in a second display mode.

In FIG. 15A, the first image display region 51 is controlled to display only images based on the image files recorded in the memory card 4. The second image display region 52 is controlled to display only images based on the image files recorded in the internal memory 5. The images based on the image files recorded in the memory card 4 are referred to as "Image Ac", "Image Bc", "Image Cc" and so on. The images based on the image files recorded in the internal memory 5 are referred to as "Image Ab", "Image Bb", "Image Cb" and so on.

In FIG. 15A, by activating the first image display region 51 and operating the first button 26a or the second button 26b in FIG. 3, the images based on the image files recorded in the memory card 4 can be page-forwarded. Also, by activating the second image display region 52 and operating the first button 26a or the second button 26b in FIG. 3, the images based on the image files recorded in the internal memory 5 can be page-forwarded. The switching of the activated state between the first image display region 51 and the second image display region 52 can be performed by moving the solid frame 53 to a desired image display region by operating the third button 26c or the fourth button 26d in FIG. 3.

Thereby, the images recorded in the memory card 4 and the internal memory 5 can be displayed simultaneously in the liquid crystal monitor 22.

[2-4-7. Display Operation when Copying Image Between Memories]

Figure 15B:
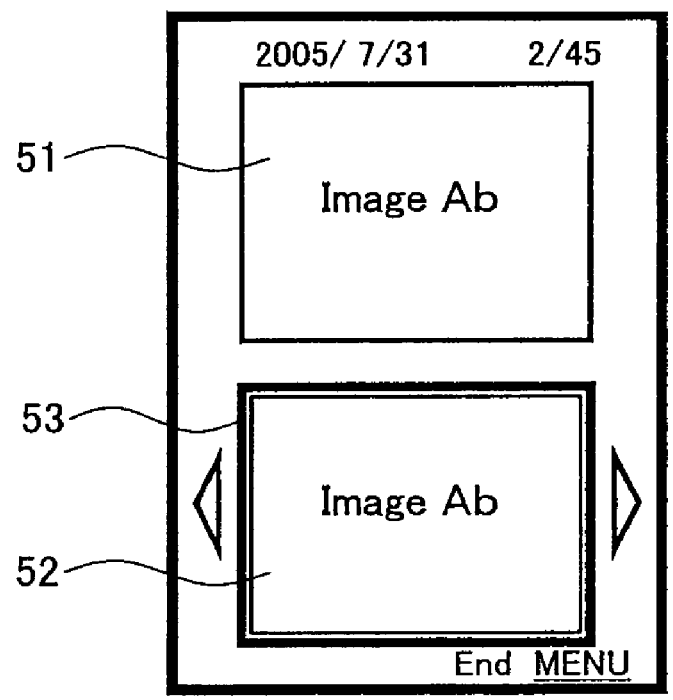

A description will be given of an operation for copying image files between memories in the state in which an image based on the image files recorded in the memory card 4 is displayed in the first image display region 51 and an image based on the image files recorded in the internal memory 5 is displayed in the second image display region 52 as shown in FIGS. 15A and 15B. The operation for copying the image files can be performed by operating the copy button 27 in FIG. 3.

First, when copying an image file recorded in the internal memory 5 into the memory card 4, as shown in FIG. 15A, Image Bc is displayed in the first image display region 51, Image Ab is displayed in the second image display region 52, and the second image display region 52 is activated. In FIG. 15A, upon operation of the copy button 27, the microcomputer 8 performs control to copy the image file of Image Ab displayed in the second image display region 52 into the memory card 4. At the same time, the microcomputer 8 performs control to display Image Ab in the first image display region 51 as shown in FIG. 15B. In other words, the image file of Image Ab is stored in both the memory card 4 and the internal memory 5, and Image Ab is displayed in both the first image display region 51 and the second image display region 52.

When copying another image file recorded in the internal memory 5 into the memory card 4, in FIG. 15A or 15B, the second image display region 52 is activated. Subsequently, when the user operates the first button 26a or the second button 26b in FIG. 3, an image that the user wants to copy is displayed in the second image display region 52. Then, with the operation of the copy button 27, the microcomputer 8 performs control to copy the image file of the image displayed in the second image display region 52 into the memory card 4.

When copying the image file recorded in the memory card 4 into the internal memory 5, by operating the third button 26c or the fourth button 26d shown in FIG. 3, the solid frame 53 shown in FIG. 15B is moved to the first image display region 51 so as to activate the first image display region 51. Subsequently, when the user operates the first button 26a or the second button 26b, the image displayed in the first image display region 51 is page-forwarded, and the image that the user wants to copy is displayed in the first image display region 51. Then, with the operation of the copy button 27, the microcomputer 8 performs control to copy the image file of the image displayed in the first image display region 51 into the internal memory 5.

In the manner described above, image files can be copied between memories in the state in which an image based on the image files recorded in the memory card 4 and an image based on the image files recorded in the internal memory 5 are displayed simultaneously, and therefore the state before copying (FIG. 15A) and the state after copying (FIG. 15B) can be checked visually, so that the copying operation can be performed in a simple and sure manner.

In the description given above, the operation for copying image files is described, but the operation for moving image files can be performed similarly.

Further, in the state shown in FIG. 15A, by operating the copy button 27, for example, a message such as "Copy image?" may be displayed to ask the user whether or not to copy the image file.

[2-4-8. Display Operation when Mark Setting]

The "favorite function" refers to a function of adding a mark to a specific image. By adding a mark to images, it is possible to delete all images except the image(s) having an added mark by a single operation, or to perform a slide show in which only the images having an added mark are shown. This function is referred to as the "favorite function" or a "mark function", and many digital still cameras available in recent years have this function. Hereinafter, the operation to add a mark to a specific image using this function is referred to as "mark setting", and the operation to remove the added mark is referred to as "mark removal". The operation for mark setting and mark removal can be performed by the mark button 28 in FIGS. 2 and 3.

The method for mark setting will be described first.

Figure 16A:
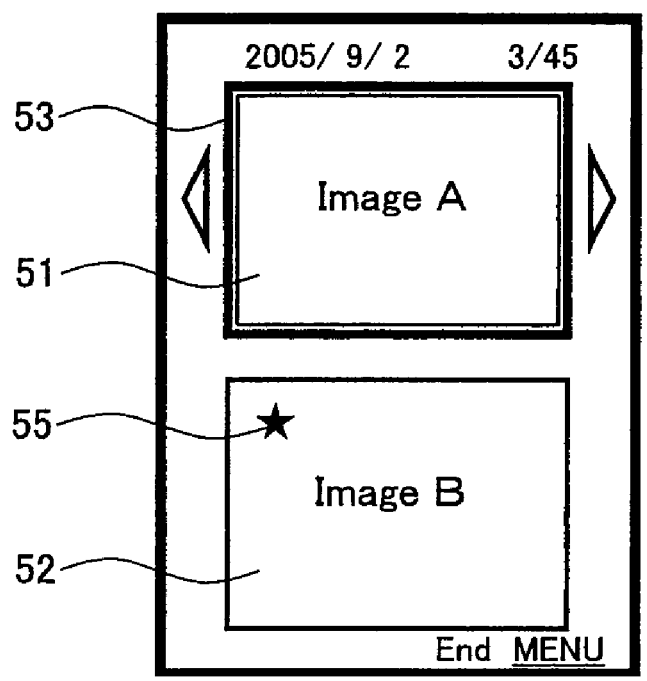
FIGS. 16A to 16B are schematic diagrams illustrating a display state in a second display mode.
Figure 16B:
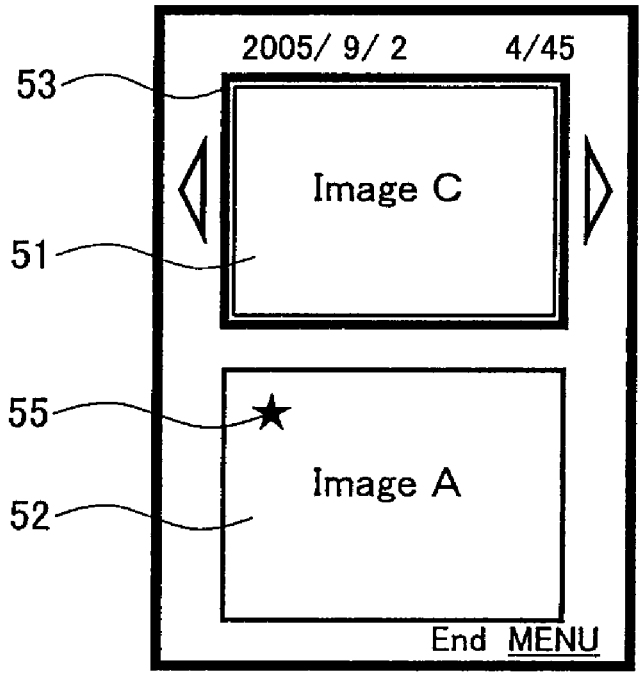

In FIGS. 16A and 16B, the first image display region 51 is controlled to display only images not having a mark set, and only images not having a mark set can be page-forwarded. The second image display region 52 is controlled to display only images having a mark set, and only images having a mark set can be page-forwarded. For the images having a mark set, a mark 55 is displayed on the image by the OSD controller 9 (see FIG. 1). Further, page-forwarding in the first image display region 51 or the second image display region 52 can be performed by operating the first button 26a or the second button 26b in FIG. 3. The switching of the activated state can be performed by operating the third button 26c or the fourth button 26d in FIG. 3.

In FIG. 16A, Image A not having a mark set is displayed in the first image display region 51, Image B having a mark set is displayed in the second image display region 52, and the first image display region 51 is activated. In FIG. 16A, upon operation of the mark button 28, the microcomputer 8 performs a mark setting for Image A displayed in the first image display region 51. When a mark setting is performed for Image A, a favorite flag is set in the management information in the file management table shown in FIG. 4, and at the same time, Image A is displayed in the second image display region 52 as shown in FIG. 16B. When Image A is displayed in the second image display region 52 as shown in FIG. 16B, the microcomputer 8 performs control to display the image after the mark 55 is added by the OSD controller 9. Because the microcomputer 8 performs control to display an image not having a mark set in the first image display region 51, instead of Image A, Image C (an image next to Image A and not having a mark set) is displayed in the first image display region 51.

When a mark setting is performed for another image not having a mark set, the first image display region 51 is activated, and the first button 26a or the second button 26b in FIG. 3 is operated to display an image the user wants to mark in the first image display region 51. Subsequently, with the operation of the mark button 28, the microcomputer 8 performs a mark setting for the image file of the image displayed in the first image display region 51.

Figure 17A:
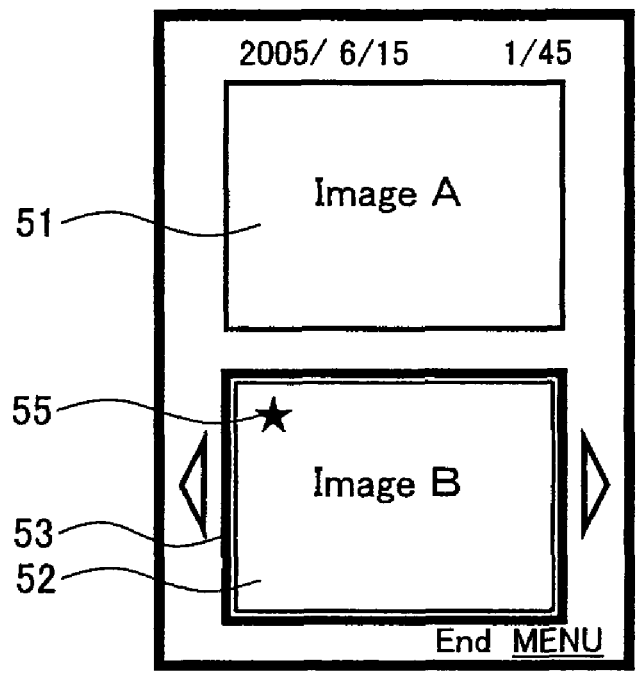
FIGS. 17A to 17B are schematic diagrams illustrating a display state in a second display mode.
Figure 17B:
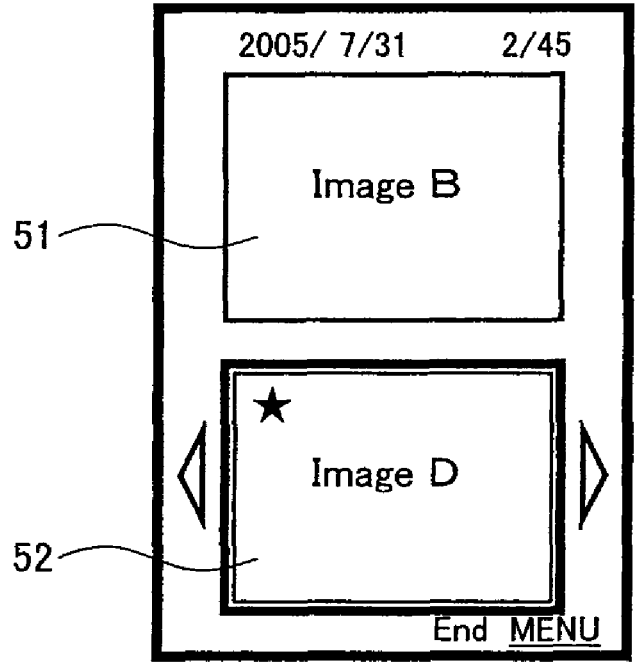

When removing the mark setting, by operating the third button 26c or the fourth button 26d in FIG. 3, the second image display region 52 is activated as shown in FIG. 17A. Then, upon operation of the mark button 28, the microcomputer 8 removes the mark setting of Image B displayed in the second image display region 52. The Image B from which the mark setting is removed is displayed in the first image display region 51 as shown in FIG. 17B. Image D, which is next to Image B and has a mark set, is displayed in the second image display region 52.

Subsequently, mark setting information will be described.

The information on mark setting is contained in the AUTPLAY3.MRK file stored in the MISC folder shown in FIG. 5. FIG. 18 shows a configuration of the AUTPLAY3.MRK file. The AUTPLAY3.MRK file is roughly divided into a header portion in which information on the image pickup apparatus and the date and time of mark setting is written, and information on the image file having a mark set.

As shown in FIG. 18, the information on the image file contains the format and file name of the image files to which a mark is newly set. As described previously, when a mark setting is performed for an image file, the information of the image file to which a mark is newly set is written into the AUTPLAY3.MRK file, and the AUTPLAY3.MRK file is overwritten. Further, as shown in the second image display region 52 of FIGS. 16 and 17, when the image of the image file having a mark set is displayed, by referring to the AUTPLAY3.MRK file, the image files having a mark set are managed separately.

[2-4-9. Display Operation of Vertical Image]

In the description given above, the display of images whose short side direction serves as the vertical direction is described. However, according to this embodiment, images whose long side direction serves as the vertical direction (hereinafter referred to as "vertical images") can be displayed. The vertical images are images photographed by, for example, the image pickup apparatus held in the position shown in FIG. 3.

When photographing a vertical image with the image pickup apparatus, an angle sensor contained in the image pickup apparatus detects that the image pickup apparatus is in the position shown in FIG. 3. By the detection signal of the angle sensor, the rotation information of the image is written into the header information of the image file shown in FIG. 9. The angles detected by the angle sensor are 90 degrees, 180 degrees, 270 degrees, and the like relative to the upright position of the image pickup apparatus as shown in FIG. 2 being set as reference (0 degrees). For example, the position shown in FIG. 3 corresponds to 270 degrees.

Figure 19A:
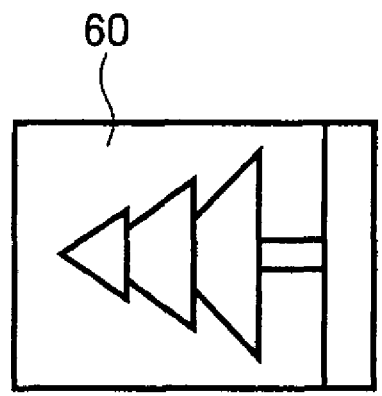
FIGS. 19A to 19C are schematic diagrams used to explain an operation to display a vertical image.
Figure 19B:
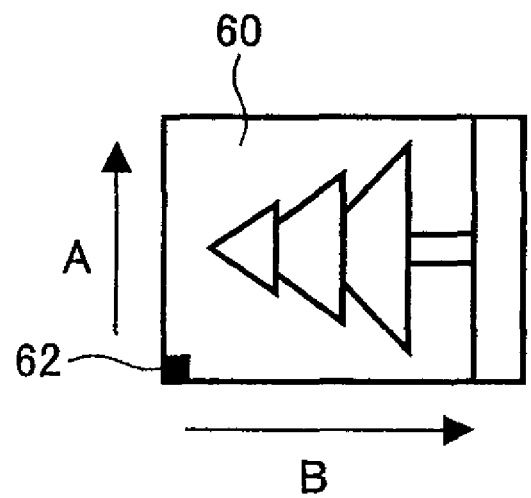

When playing back the vertical image, the rotation information in the header information of the image file is read out, and based on the rotation information, the display starting position of the image is determined. FIGS. 19A and 19B show a vertical image that is read out from the memory card 4 and stored temporarily in the buffer memory 6. Because photographed images are recorded relative to the direction of the angle of view of the imaging element, vertical images are recorded as shown in FIG. 19A.

Figure 19C:
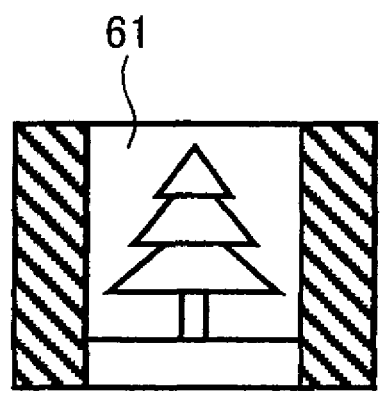

When playing back the vertical image, a rotation process is performed, based on the rotation information of the header information, for an image 60 read out from the memory card 4 or the like and played back as shown in FIG. 19A. More specifically, when the image file of the image 60 is read out from the memory card 4 or the like, the read-out starting position of the image 60 is changed according to the rotation information of the header information. When playing back a normal image (the rotation information is 0 degrees), the read-out is performed from the upper left of the image, but when the rotation information is, for example, 270 degrees, the read-out is performed from the lower left of the image. More specifically, as shown in FIG. 19B, the read-out is performed for each row, starting from a position 62 located at the lower left of the image 60 toward the direction of the arrow A. Subsequently, the image is read out from each row toward the direction of the arrow B. Thereby, a vertical image 61 as shown in FIG. 19C can be obtained.

When the rotation information is 90 degrees, the read-out is performed from the upper right of the image 60 shown in FIG. 19A. When the rotation information is 180 degrees, the read-out is performed from the lower right of the image 60 shown in FIG. 19A.

A description will now be given of the display of vertical images in the second display mode.

Figure 20:
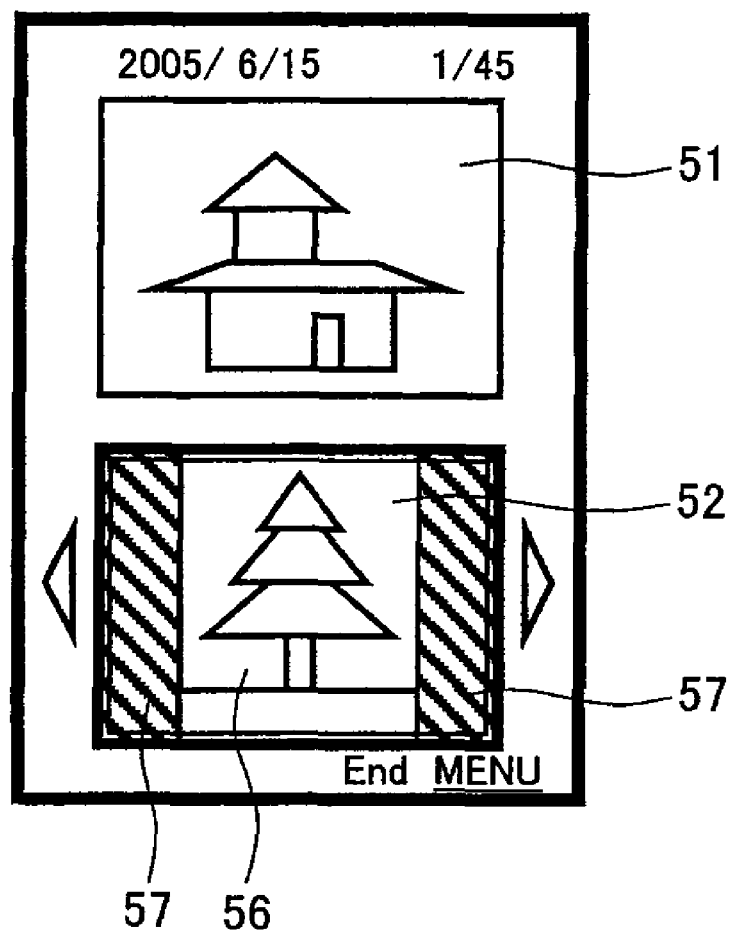
FIG. 20 is a schematic diagram showing a state in which a vertical image is displayed in a second display mode.

In FIG. 20, a vertical image 56 is displayed in the second image display region 52 in the second display mode. As shown in FIG. 20, when the vertical image 56 is displayed in the image display region while retaining its aspect ratio, the vertical image 56 is displayed at a size smaller than the horizontal image displayed in the first image display region 51. On both right and left sides of the vertical image 56, for example, a black image 57 is displayed.

[2-5. Method for Externally Outputting Image]

A description will now be given of an operation for displaying an image based on the image files recorded in the memory card 4 or the internal memory 5 in a television receiver.

When outputting image data to a television receiver, a video cable capable of transferring image signals is connected to the external output portion 11 of FIG. 1. The other end of the video cable is connected to a video input terminal of the television receiver. Subsequently, the television receiver is turned on, and an external input mode is set. Then, the image pickup apparatus is turned on, and the playback mode is set. Thereafter, by operating the operation portion 12, an image file that the user wants to output to the television receiver is selected. Thereby, the image data of the selected image file is converted into an image signal (analog image signal), and the image signal is output to the television receiver.

When outputting images to the television receiver while the image pickup apparatus is in the second display mode, only the image signal of the activated image is output by the control of the microcomputer 8.

For example, when the image pickup apparatus displays as shown in FIG. 12A in the liquid crystal monitor 22, the image signal of Image A displayed in the activated first image display region 51 is output to the television receiver. The television receiver displays Image A on its screen based on the input image signal.

Further, when the second image display region 52 is changed from the state shown in FIG. 12A to the activated state as shown in FIG. 12B, the image signal of Image B displayed in the second image display region 52 is output to the television receiver. The television receiver displays Image B on its screen based on the input image signal.

As shown in FIG. 12C, when the image of the activated second image display region 52 is page-forwarded to display Image C, the image signal of Image C is output to the television receiver. The television receiver displays Image C based on the input image signal.

The video input terminal of the television receiver may be a terminal capable of inputting analog image signals or a terminal capable of inputting image data (digital data). Examples of the terminal capable of inputting analog image signals include a composite video terminal (RCA terminal), a component video terminal (chrominance input terminal), an S terminal (separate terminal) and a D terminal. Examples of the terminal capable of inputting image data include a terminal according to the HDMI standard (High Definition Multimedia Interface), a terminal according to the IEEE1394 standard (IEEE Std. 1394-1995 IEEE Standard for a High Performance serial Bus), and a LAN (Local Area Network) terminal.

Although the configuration described above is one in which the image data recorded in the memory card 4 or the internal memory 5 is converted to an analog image signal, and the analog image signal is output to a television receiver, it is also possible to adopt a configuration in which, if the television receiver can decode the image data, the image data may be output to the television receiver without converting the image data into an analog image signal.

It is also possible to adopt a configuration in which the image data (digital data) produced in the image pickup apparatus is decoded into an analog image signal in the image pickup apparatus, and the analog image signal is output to the television receiver, or a configuration in which the image data is transferred directly to the television receiver from the image pickup apparatus, and then decoded into an analog image signal in the television receiver.

Further, a configuration is also possible in which not only image signals are transferred from the image pickup apparatus to the television receiver, but also HTML (Hypertext Markup Language) data containing images in the image pickup apparatus is transferred. More specifically, in the image pickup apparatus, HTML data containing image data recorded in the memory card 4 or the like is produced, and the produced HTML data is transferred to the television receiver. The television receiver executes a browser software and displays the HTML data transferred from the image pickup apparatus.

[2-6. Image Enlarging Process in Second Display Mode]

Figure 21A:
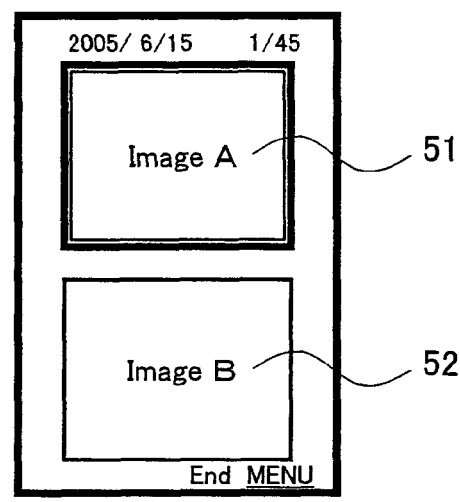
FIGS. 21A to 21C are schematic diagrams illustrating a display state in a second display mode.
Figure 21B:
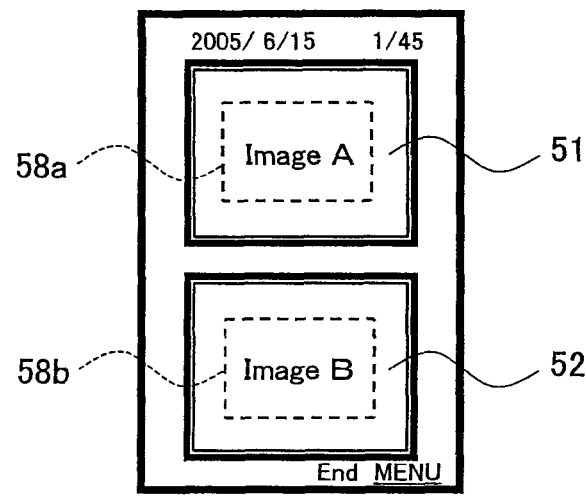
Figure 21C:
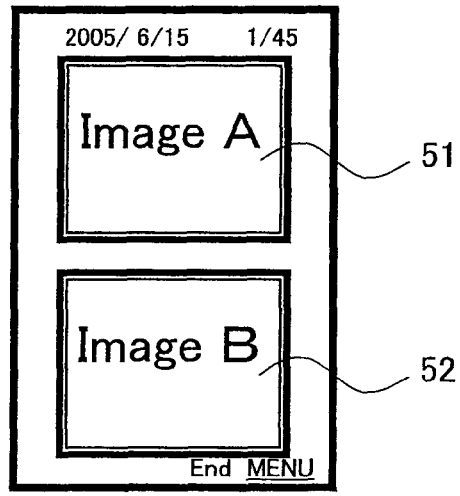

FIGS. 21A to 21C show changes when the images displayed in the first image display region 51 and the second image display region 52 are enlarged simultaneously.

First, as shown in FIG. 21A, while the first image display region 51 (or the second image display region 52) is activated, by performing a predetermined operation, both of the image display regions can be activated as shown in FIG. 21B. According to this embodiment, by depressing the third button 26c and the fourth button 26d of the cursor button 26 (see FIG. 3) simultaneously, the image display regions can be switched to the state shown in FIG. 21B.

In the state shown in FIG. 21B, when the zoom switch 25 is operated to the T side, a portion indicated by a region 58a in the image displayed in the first image display region 51 is cut out, and then stored temporarily in the buffer memory 6 (see FIG. 1), after which the portion undergoes an image enlarging process in the image processing portion 2. At the same time, a portion indicated by a region 58b in the image displayed in the second image display region 52 is cut out, and then stored temporarily in the buffer memory 6, after which the portion undergoes an image enlarging process in the image processing portion 2. FIG. 21C shows the display state of the liquid crystal monitor 22 after the image enlarging process.

Although, in this embodiment, the regions 58a and 58b to be cut out are set substantially at the center of the image displayed in the first image display region 51 and the second image display region 52, the region to be cut out is not limited to the center of the image, and another portion may be cut out.

Further, the enlargement magnification for the image enlarging process is changed to 120%, 140% and so on, each time the zoom switch 25 is operated to the T side as described previously, but the enlargement magnification is not limited to the above values.

Although the configuration described in this embodiment is one in which, with the simultaneous depression of the third button 26c and the fourth button 26d of the cursor button 26 in the state shown in FIG. 21A, the image display regions are switched to the state shown in FIG. 21B, it is also possible to adopt a configuration in which, with the operation of the zoom switch 25 to the T side in the state shown in FIG. 21A, both the first image display region 51 and the second image display region 52 undergo the image enlarging process. In this case, the operation to activate both image display regions is unnecessary, so operability can be improved.

Figure 22A:
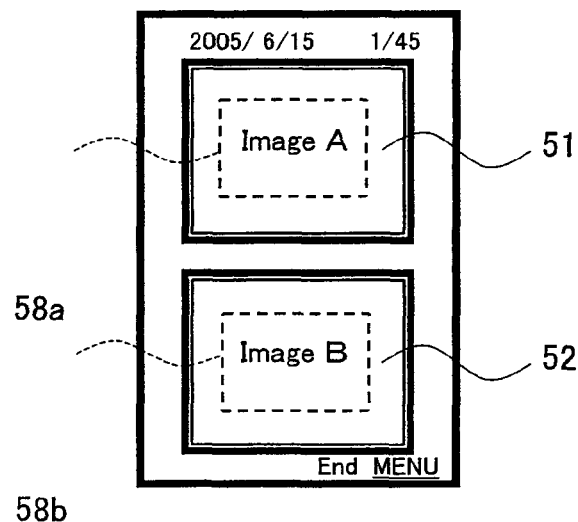
FIGS. 22A to 22C are schematic diagrams illustrating a display state in a second display mode.
Figure 22B:
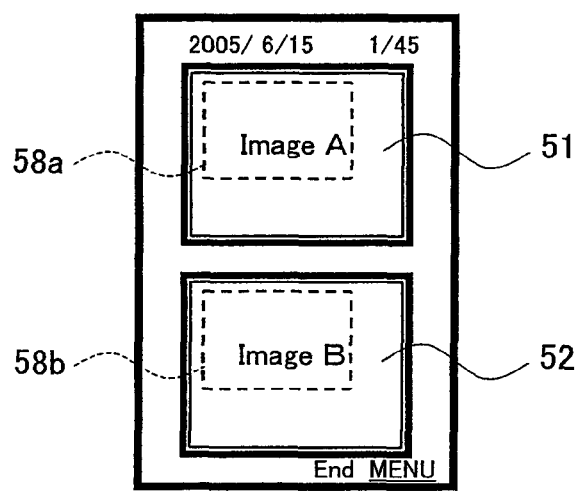
Figure 22C:
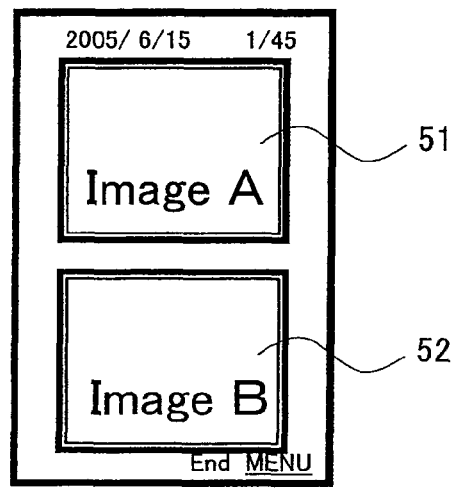

Also, the position of the regions 58a and 58b is not necessarily fixed, and a configuration can be employed in which the user can freely set the position of the regions 58a and 58b. In this case, for example, when the liquid crystal monitor 22 is switched into the display state as shown in FIG. 22A (the same state as that of FIG. 21B) by performing a predetermined operation, frames (e.g., the dotted line frames in FIG. 22A) surrounding the regions 58a and 58b are displayed within the first image display region 51 and the second image display region 52. Subsequently, the user operates the cursor button 26 in a direction of up, down, right or left, whereby the frames are moved to a desired position as shown in FIG. 22B. Then, with the operation of the zoom switch 25 to the T side, the portions indicated by the regions 58a and 58b in the images displayed in the first image display region 51 and the second image display region 52 are cut out and stored temporarily in the buffer memory 6 (see FIG. 1), after which the portions undergo the image enlarging process in the image processing portion 2. In the example shown in 22B, in the first image display region 51 and the second image display region 52, the upper left portions in FIG. 22B undergo the image enlarging process. FIG. 22C shows the display state of the liquid crystal monitor 22 after the image enlarging process.

Figure 23A:
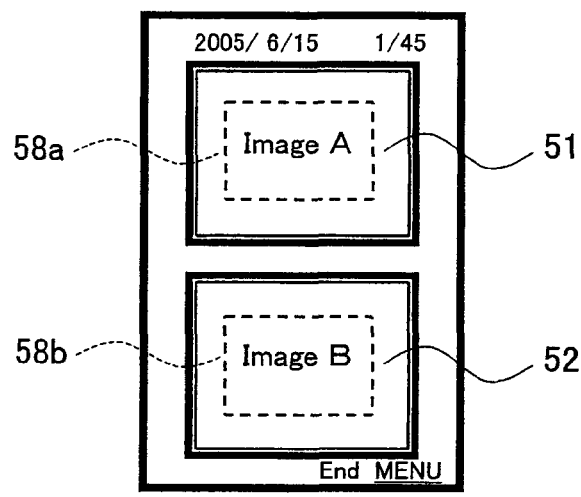
FIGS. 23A to 23C are schematic diagrams illustrating a display state in a second display mode.
Figure 23B:
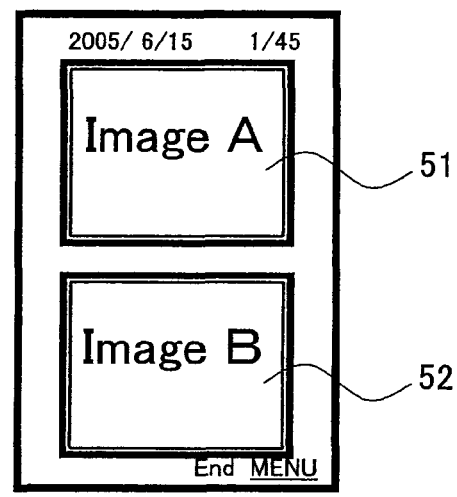
Figure 23C:
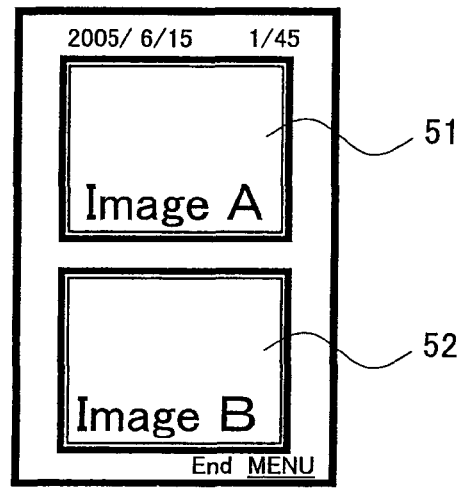

As shown in FIGS. 23A to 23C, a configuration is also possible in which, with the operation of the cursor button 26 in a direction of up, down, right or left after the images are enlarged, the cut-out position indicated by the regions 58a and 58b is changed. When this operation is performed, the images displayed in the first image display region 51 and the second image display region 52 are scrolled according to the direction in which the cursor button 26 is operated. In the example shown in FIGS. 23A to 23C, with the operation of the zoom switch 25 to the T side in the display state shown in FIG. 23A, the centers of the images indicated by the regions 58a and 58b are cut out, and enlarged as shown in FIG. 23B. In the state shown in FIG. 23B, when the third button 26c of the cursor button 26 is operated, the cut-out position of the regions 58a and 58b is moved upward in the drawing, so that the display changes to the state shown in FIG. 23C.

As described above, a configuration is employed in which the images displayed in the first image display region 51 and the second image display region 52 can be enlarged simultaneously, which is useful when comparing the details of a plurality of images.

[2-7. Method for Externally Outputting Two Images]

In the method for externally outputting an image described in 2-5 above, in the second display mode, only the image signal of the activated image is output to a television receiver or the like. In the method for externally outputting images described here, in the second display mode, the image signals of both images displayed in the first image display region 51 and the second image display region 52 are output simultaneously to a television receiver or the like.

When externally outputting image signals, first, a video cable is connected to the external output portion 11 (see FIG. 1). The other end of the video cable is connected to a television receiver (not shown).

Figure 24:
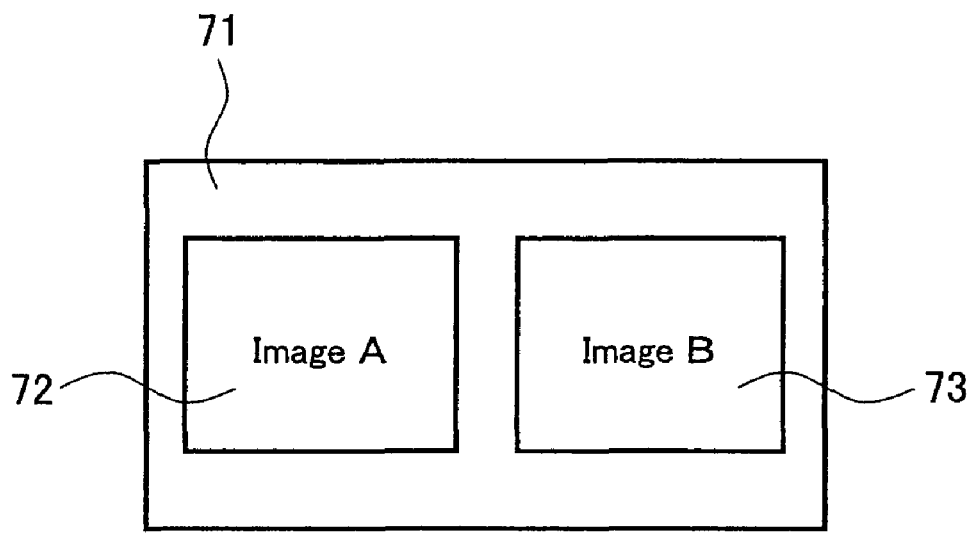
FIG. 24 is schematic diagram illustrating a output image.

Then, the image pickup apparatus is switched into, for example, the second display mode as shown in FIG. 10C. Thereby, the image processing portion 2 produces an output image 71 including an image 72 having been displayed in the first image display region 51 and an image 73 having been displayed in the second image display region 52 as shown in FIG. 24. The image signal of the output image 71 is output from the external output portion 11 and input to a television receiver via the cable. The television receiver displays the output image 71 in its screen based on the input image signal. In order to display the images at an aspect ratio suitable for the screen of the television receiver, in the output image 71, the images 72 and 73 are arranged horizontally as shown in FIG. 24.

Figure 25:
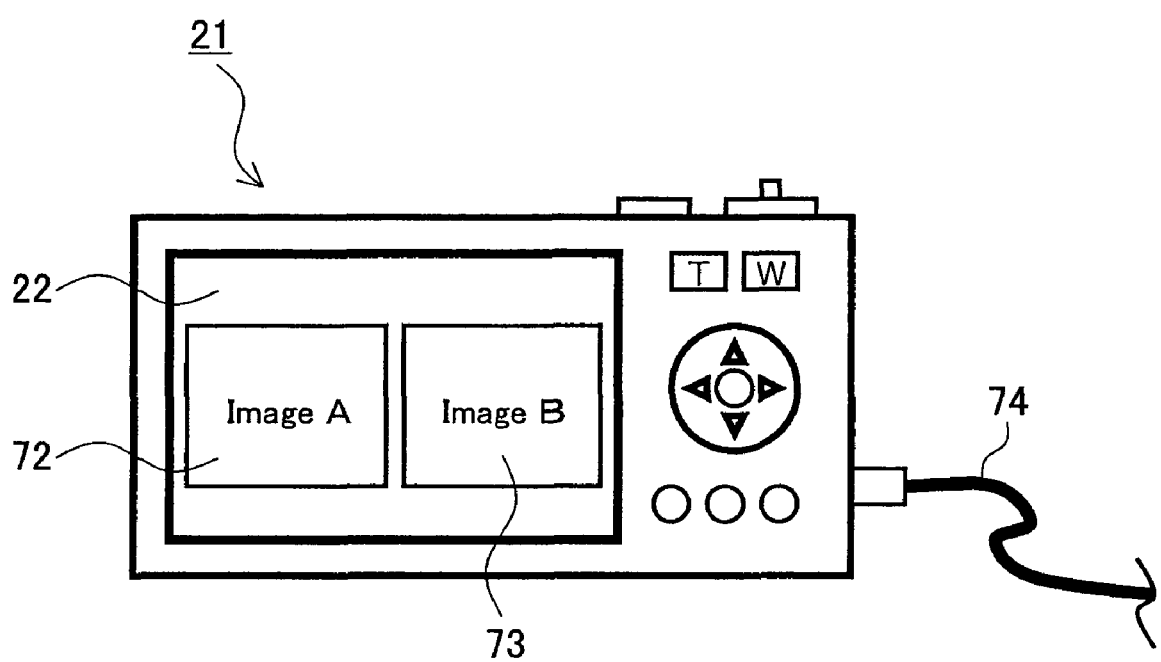
FIG. 25 is a side view of an image pickup apparatus.

In the above configuration, the output image 71 shown in FIG. 24 is output to the television receiver when the images are displayed vertically in the liquid crystal monitor 22 as shown in FIG. 10C, but it is also possible to perform a control such that the display in the liquid crystal monitor 22 automatically changes from the display state shown in FIG. 10C in which images are arranged vertically to that shown in FIG. 25 in which images are arranged horizontally upon connection of a cable 74 to the main body 21 as shown in FIG. 25. By changing the display of the liquid crystal monitor 22 in synchronization with the connection of the cable 74 as described above, the image that is actually displayed in the television receiver can be imagined easily.

Although the configuration shown in this embodiment is one in which the main body 21 and the television receiver are connected with the cable 74, it is also possible to adopt a configuration in which the main body 21 and the television receiver are connected via wireless communication. In this case, it is also possible to adopt a configuration in which, when the microcomputer 8 detects that the data transmission between the main body 1 and the television receiver is established, the display of the liquid crystal monitor 22 is changed to that as shown in FIG. 25.

[2-8. Method for Capturing Still Image]

The method for capturing a still image from a moving image will now be described. The capturing of still images can be performed for moving image files recorded in the memory card 4 or the internal memory 5, but, in the following description, the method for capturing a still image while a moving image file recorded in the memory card 4 is being played back will be described.

Many digital still cameras available in recent years have, in addition to a function of photographing still images, a function of shooting moving images. The moving image shot by the image pickup apparatus of this embodiment is recorded in the memory card 4 in a predetermined file format (a moving image format such as MPEG). The moving image file recorded in the memory card 4 can be read out from the memory card 4 and played back. Further, as long as the moving image file is in a format that can be decoded by the image pickup apparatus of this embodiment, it is also possible to play back a moving image file recorded into the memory card 4 using other devices (personal computer, DVD recorder or the like).

To play back a moving image using this apparatus, when the image pickup apparatus is set to the playback mode by the user, the microcomputer 8 performs control to display an image list (still images/moving images) in the liquid crystal monitor 22. The user selects a moving image file from the image list displayed in the liquid crystal monitor 22 by operating the cursor button 26. Thereby, the still image included at the top of the moving image file is displayed in the liquid crystal monitor 22 as shown in FIG. 10A.

Subsequently, upon operation of the center button 26e by the user, the microcomputer 8 performs control to display a playback menu in the liquid crystal monitor 22 as shown in FIG. 10B. Then, when the cursor button 26 is operated by the user and "double screen display" is selected, the microcomputer 8 switches the display state of the liquid crystal monitor 22 into the second display mode. Then, when the third button 26c of the cursor button 26 is operated by the user, the microcomputer 8 decodes the selected moving image file, and the playback of the moving image starts.

Figure 26A:
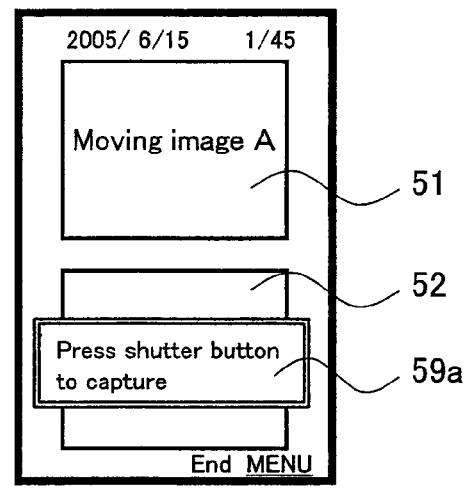
FIGS. 26A to 26C are schematic diagrams illustrating a display state in a second display mode.

During the playback of the moving image, the liquid crystal monitor 22 appears as shown in FIG. 26A. As shown in FIG. 26A, in the first image display region 51, the moving image being played back is displayed. In the second image display region 52, a monochrome image or a message 59a that guides the user in performing the capture operation is displayed.

Figure 26B:
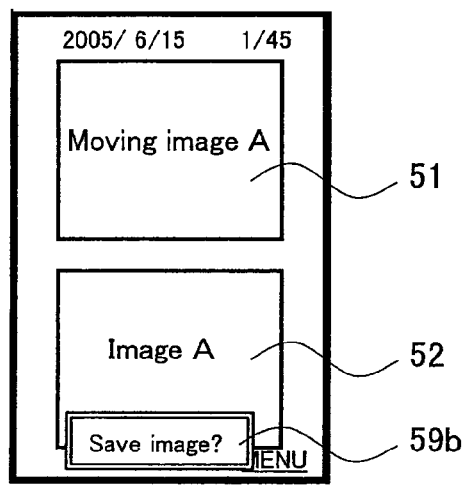

With the operation of the release switch 23 by the user while the moving image is being played back as shown in FIG. 26A, a still image at the timing of the operation of the release switch 23 can be captured from the moving image being played back. FIG. 26B shows the display state of the liquid crystal monitor 22 when a still image is captured.

As shown in FIG. 26B, at the time of capturing a still image, the moving image being played back stays displayed in the first image display region 51, whereas in the second image display region 52, the captured still image is displayed. At the same time, a message 59b is displayed near the second image display region 52. At the time of FIG. 26B, the captured still image is only stored in the buffer memory 6 and is not recorded in the memory card 4. By performing a predetermined operation (in this embodiment, by depressing the fourth button 26d) in the state shown in FIG. 26B, the microcomputer 8 performs control to convert the captured image stored in the buffer memory 6 into an image file and to record the image file in the memory card 4.

Figure 26C:
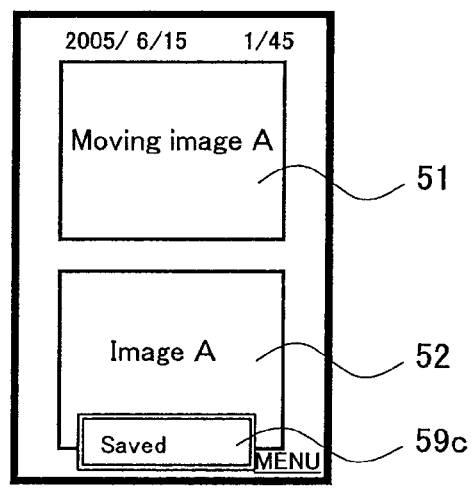

FIG. 26C shows the display state after the image file is recorded in the memory card 4. As shown, a message 59c is displayed.

After a still image is captured as shown in FIG. 26B, or after the image file of a captured still image is recorded in the memory card 4 as shown in FIG. 26C, the second image display region 52 keeps displaying the still image captured the last time until the release switch 23 is operated again. In this state, when the release switch 23 is operated again, a newly captured still image is displayed in the second image display region 52.

Figure 27A:
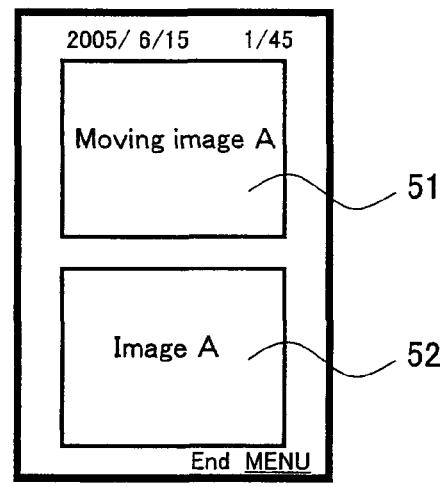
FIGS. 27A to 27C are schematic diagrams illustrating a display state in a second display mode.
Figure 27B:
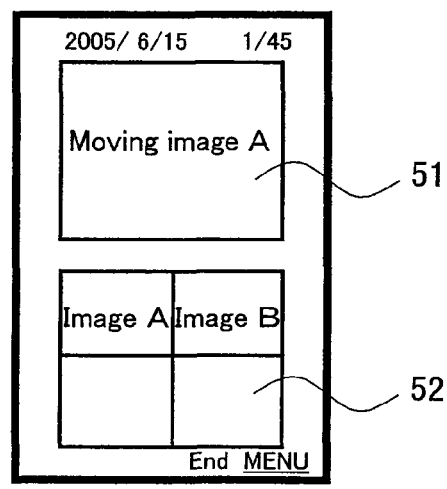
Figure 27C:
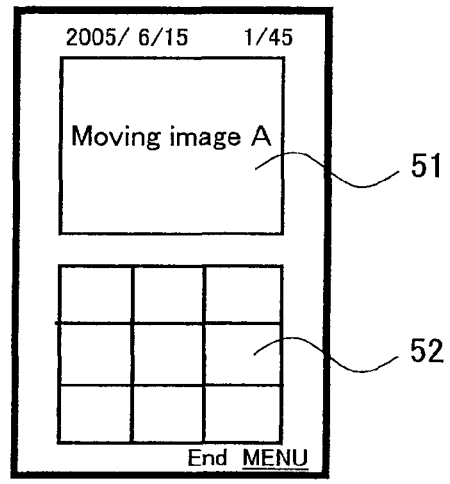

In the above description, the last captured image is displayed in the second image display region 52, but it is also possible to adopt a configuration in which a plurality of captured still images are displayed simultaneously. FIGS. 27A to 27C show examples of simultaneously displaying a plurality of captured still images.

When the release switch 23 is operated the first time during the playback of a moving image, one captured still image is displayed in the second image display region 52 as shown in FIG. 27A. Subsequently, when the release switch 23 is operated the second time, two captured still images are displayed simultaneously in the second image display region 52 as shown in FIG. 27B. At this time, the second image display region 52 is divided into a plurality of regions so that a plurality of still images can be displayed simultaneously (quadrants in the example shown in FIG. 27B). In the example shown in 27B, the second image display region 52 is divided into four regions, so that a maximum of four still images can be displayed simultaneously.

Subsequently, while the liquid crystal monitor 22 appears as shown in FIG. 27B, when the release switch 23 is operated, the second image display region 52 is divided into nine regions as shown in FIG. 27C, so that a maximum of nine still images can be displayed simultaneously.

Although the configuration shown in this embodiment is one in which the capturing of a still image is performed each time the release switch 23 is operated, it is also possible to adopt a configuration in which the microcomputer 8 performs control to automatically capture still images at a predetermined time interval (e.g., every several seconds) and to record them in the memory card 4 or the internal memory 5.

Further, although the configuration shown in this embodiment is one in which a captured still image is once stored in the buffer memory 6, and the still image file is recorded in the memory card 4 or the internal memory 5 with the operation of the fourth button 26d, it is also possible to adopt a configuration in which, without storing a captured image, the still image file is stored in the memory card 4 or the internal memory 5. This eliminates the need for the operation of recording the still image file into the memory card 4 (the operation of the fourth button 26d in this embodiment), and the operability can be improved.

Further, although a configuration was employed in which the capture operation is performed during the playback of a moving image, it is also possible to perform the capture operation while a moving image is played back frame by frame or paused. Thereby, it is possible to capture a still image at a desired timing.

[3. Effects of Embodiment, etc.]

As described above, according to this embodiment, a second display mode is provided in which two images are displayed such that they are arranged vertically with the short side direction of the images aligned with the vertical direction in the liquid crystal monitor 22 held with the long side direction aligned with the vertical direction, and therefore the images can be displayed at a resolution as high as possible when they are displayed in a double screen, and the visual recognition of images can be improved.

Further, it is possible easily to compare a plurality of images by displaying the plurality of images simultaneously.

Further, a configuration is adopted in which either one of the first image display region 51 and the second image display region 52 is activated and the image displayed in the activated display region can be switched to an image based on other image data stored in the memory card 4 or the like, and thus a desired image can be displayed in the first image display region 51 or the second image display region 52.

Further, a configuration is adopted in which the control portion accepts an instruction to select either of the first image display region 51 and the second image display region 52 to activate, and thus a desired image can be displayed in the first image display region 51 or the second image display region 52.

Further, a control is performed such that, in the first display mode, an on-screen display is displayed in the display screen with the short side direction of the display screen aligned with the vertical direction, and, in the second display mode, an on-screen display is displayed in the display screen with the long side direction of the display screen aligned with the vertical direction, and thus, in the first display mode and the second display mode, the display direction of the image can be matched with the display direction of the on-screen display.

Further, in the second display mode, it is possible to display an image based on vertically long image data.

Further, a configuration is adopted in which the internal memory 5 that can store image data and the medium holding unit (card slot 3) capable of removably holding the memory medium (memory card 4) that can store image data further are provided, and in the second mode, the microcomputer 8 performs control to display an image based on the image data stored in the memory card 4 in one of the first image display region 51 and the second image display region 52 and to display an image based on the image data stored in the internal memory 5 in the other of the first image display region 51 and the second image display region 52, and thus an image based on the image data recorded in the internal memory 5 and an image based on the image data recorded in the memory card 4 can be displayed simultaneously.

Further, a configuration is adopted in which, in the second display mode, when an instruction to change the storage location of the image file of the image displayed in the display region is input, a control is performed to store the image file into the internal memory when the image file has been stored in the memory medium, and to store the image file into the memory medium when the image file has been stored in the internal memory, and thus image data can be copied or moved easily between the internal memory 5 and the memory card 4.

Further, in the second display mode, when an instruction to delete image data is input while either of the first display region 51 and the second display region 52 is activated, a control is performed to delete the image data of the image displayed in the activated display region, and thus it is possible to view the image to be deleted before deleting it.

It is also possible to adopt a configuration in which, in the second display mode, when an instruction to output image data to an external device is input while either of the first display region 51 and the second display region 52 is activated, a control is performed to output the image data of the image displayed in the activated display region to the external device.

Further, it is also possible to adopt a configuration in which, in the second display mode, while either of the first image display region 51 and the second image display region 52 is activated, when the zoom switch 25 shown in FIG. 2 is operated, the image displayed in the activated display region can be enlarged or reduced. In this case, for example, a control can be performed to reduce the image when the zoom switch 25 is operated to the W side, and to enlarge the image when the zoom switch 25 is operated to the T side. The enlargement/reduction magnification of the image can be increased/decreased at a pre-set magnification each time the zoom switch 25 is operated to the T side/W side. For example, each time the zoom switch 25 is operated to the T side, the magnification can be increased gradually to 120%, 140% and so on, and each time the zoom switch 25 is operated to the W side, the magnification can be decreased gradually to 80%, 60% and so on. It is also possible to adopt a configuration in which, when the zoom switch 25 is operated continuously to the T side, the enlargement magnification of the image is increased continuously to enlarge the image continuously. Further, it is also possible to adopt a configuration in which, when the zoom switch 25 is operated continuously to the W side, the reduction magnification of the image is decreased continuously to reduce the image continuously. A configuration may be adopted in which the enlarged or reduced image is restored to the original size when the display is changed to another image, or in which each image retains the enlarged/reduced size even when the display is changed to another image.

Further, a mark setting/removal function is provided, and this enables simultaneous display of an image to which a mark has been added and an image to which no mark has been added, and thus it is possible to set or remove the mark easily while viewing the image.

Further, the cursor button 26 is configured such that, in the second display mode, the first button 26a enables an operation instructing rightward movement relative to the display direction of the images displayed in the display screen, the second button 26b enables an operation instructing leftward movement relative to the same, the third button 26c enables an operation instructing upward movement relative to the same, and the fourth button 26d enables an operation instructing downward movement relative to the same, and thus, in the first display mode and the second display mode, the display direction of the images can be matched with the operating direction of the direction operation portion. Therefore, the operability can be improved.

Note that the USB controller 7 and the external output portion 11 need not necessarily be present. Although, in this embodiment, both the card slot 3 and the internal memory 5 are provided, a configuration is also possible in which either one is provided.

The image displaying apparatus of the present invention includes a display portion having at least short sides and long sides, and is applicable to devices capable of displaying image data. Examples of application include image pickup apparatus such as digital still cameras, digital video cameras and camera-equipped cell phones, PDAs (personal digital assistants), and portable game consoles.

[Note 1]

The image displaying apparatus of the present invention comprises: a display portion comprising a substantially rectangular display screen including at least two long sides opposed to each other and two short sides opposed to each other; and a control portion that controls a display operation of the display portion, wherein the control portion is provided with: a first display mode in which a one-screen display region for one screen image is formed in the display screen, with the short side direction of the display screen aligned with the vertical direction; and a second display mode in which a first display region and a second display region for two screen images are formed in the display screen, with the long side direction of the display screen aligned with the vertical direction, and the first display region and the second display region formed such that they are arranged up and down. According to this configuration, when images are displayed in a double screen, each image can be displayed as large as possible, and therefore the visual recognition of the details of the images can be improved.

[Note 2]

In the image displaying apparatus of the present invention, a configuration is possible in which the control portion is capable of reading out image data from a memory unit in which the image data is recorded, and is capable of displaying images based on the image data read out from the memory unit in the first display region and the second display region, respectively, in the second display mode. According to this configuration, a plurality of images can be displayed simultaneously, and a comparison can be made easily.

[Note 3]

In the image displaying apparatus of the present invention, a configuration is possible in which the control portion activates either one of the first display region and the second display region, and performs control to change the image displayed in the activated display region to an image based on another image data stored in the memory unit. According to this configuration, a desired image can be displayed in the first display region or the second display region.

[Note 4]

In the image displaying apparatus of the present invention, a configuration is possible in which, when the image displayed in the activated display region is changed to the image based on other image data stored in the memory unit, the control portion performs control to display an image other than the image displayed in the deactivated display region. According to this configuration, simultaneous display of the same image in the first and second display regions can be avoided; the displayed image can be changed rapidly. Therefore, the operability of image display can be improved.

[Note 5]

In the image displaying apparatus of the present invention, a configuration is possible in which the control portion accepts an instruction to select either of the first display region and the second display region to activate. According to this configuration, a desired image can be displayed in the first display region or the second display region.

[Note 6]

In the image displaying apparatus of the present invention, a configuration is possible in which, when an instruction to enlarge or reduce an image is input, the control portion changes the image displayed in either one of the first display region and the second display region that is activated to an enlarged or reduced image. According to this configuration, the image displayed in the activated display region can be enlarged to a desired size, and the details of the image can be viewed.

[Note 7]

In the image displaying apparatus of the present invention, a configuration is possible in which the control portion performs control to display an on-screen display within the display regions, in the first display mode, the on-screen display is displayed, with the short side direction of the display screen aligned with the vertical direction, and in the second display mode, the on-screen display is displayed, with the long side direction of the display screen aligned with the vertical direction. According to this configuration, in the first display mode and the second display mode, the display direction of images can be matched with the display direction of the on-screen display.

[Note 8]

In the image displaying apparatus of the present invention, a configuration is possible in which the memory unit is capable of storing vertically long image data whose long side direction is matched substantially with the direction of gravity, and in the second display mode, the control portion is capable of displaying an image based on the vertically long image data.

[Note 9]

In the image displaying apparatus of the present invention, a configuration is possible in which an internal memory capable of storing image data and a medium holding unit that removably holds a memory medium capable of storing image data are further provided, and in the second display mode, the control portion performs control to display an image based on the image data stored in the memory medium in one of the first display region and the second display region, and to display an image based on the image data stored in the internal memory in the other of the first display region and the second display region. According to this configuration, simultaneous display of an image based on the image data recorded in the internal memory and an image based on the image data recorded in the memory medium can be achieved.

[Note 10]

In the image displaying apparatus of the present invention, a configuration is possible in which, in the second display mode, when an instruction to change the storage location of an image file of the image displayed in the display region is input, the control portion performs control to store the image file into the internal memory when the image file has been stored in the memory medium, and to store the image file into the memory medium when the image file has been stored in the internal memory. According to this configuration, image data can be copied or moved easily between the internal memory and the memory medium.

[Note 11]

In the image displaying apparatus of the present invention, a configuration is possible in which, in the second display mode, when an instruction to delete image data is input while either of the first display region and the second display region is activated, the control portion performs control to delete the image data of the image displayed in the activated display region. According to this configuration, it is possible to view the image to be deleted before deleting it.

[Note 12]

In the image displaying apparatus of the present invention, a configuration is possible in which, in the second display mode, when an instruction to output image data to an external device is input while either of the first display region and the second display region is activated, the control portion performs control to output the image data of the image displayed in the activated display region to the external device.

[Note 13]

In the image displaying apparatus of the present invention, a configuration is possible in which a mark is added to specific image data in the image data recorded in the memory unit, and in the second display mode, the control portion performs control to display an image based on the image data to which the mark has been added in one of the first display region and the second display region, and to display an image based on image data to which the mark has not been added in the other of the first display region and the second display region. According to this configuration, simultaneous display of an image having the mark added and an image not having the mark added can be achieved, and it is possible to set or remove the mark easily while viewing the image.

[Note 14]

In the image displaying apparatus of the present invention, a configuration is possible in which, when an instruction to set the mark is input while either of the first display region and the second display region is activated, the control portion adds the mark to the image data of the image displayed in the activated display region, and displays an image of the image data to which the mark has been added in the deactivated display region. According to this configuration, simultaneous display of an image having the mark added and an image not having the mark added can be achieved, and it is possible to set the mark easily while viewing the image.

[Note 15]

In the image displaying apparatus of the present invention, a configuration is possible in which when an instruction to remove the mark is input while either of the first display region and the second display region is activated and the image data of the image displayed in the activated display region has the mark, the control portion removes the mark of the image data of the image displayed in the activated display region, and displays an image of the image data from which the mark has been removed in the deactivated display region. According to this configuration, simultaneous display of an image having the mark added and an image not having the mark added can be achieved, and it is possible to remove the mark easily while viewing the image.

[Note 16]

In the image displaying apparatus of the present invention, a configuration is possible in which an operation portion is further provided comprising: a first direction operation portion; a second direction operation portion that enables an operation in a direction opposite to the operation direction operable by the first direction operation portion; a third direction operation portion that enables an operation in a direction substantially orthogonal to the operation directions operable by the first direction operation portion and the second direction operation portion; and a fourth direction operation portion that enables an operation in a direction opposite to the operation direction operable by the third direction operation portion, and in the first display mode, relative to the display direction of the image displayed in the display screen, the first direction operation portion enables an operation instructing upward movement, the second direction operation portion enables an operation instructing downward movement, the third direction operation portion enables an operation instructing leftward movement, and the fourth direction operation portion enables an operation instructing rightward movement, and in the second display mode, relative to the display direction of the images displayed in the display screen, the first direction operation portion enables an operation instructing rightward movement, the second direction operation portion enables an operation instructing leftward movement, the third direction operation portion enables an operation instructing upward movement, and the fourth direction operation portion enables an operation instructing downward movement. According to this configuration, in the first display mode and the second display mode, the display direction of images can be matched with the operation direction of the operation portion, and the operability can be improved.

[Note 17]

In the image displaying apparatus of the present invention, a configuration is possible in which, in the second display mode, when an instruction to enlarge image size is input while both or either of the first display region and the second display region are activated, the control portion performs control to enlarge the image size of the image displayed in the activated display region. This configuration is useful when comparing the details of a plurality of images.

[Note 18]

In the image displaying apparatus of the present invention, a configuration is possible in which, when enlarging the image size of the image displayed in the activated display region, the control portion is capable of setting a cut-out position to a desired position in the image before the enlarging process. This configuration is useful when comparing the details of desired portions of the image.

[Note 19]

In the image displaying apparatus of the present invention, a configuration is possible in which, in the second display mode, when an instruction to output image data to an external displaying device is input, the control portion performs control to convert the image displayed in the first display region and the image displayed in the second display region into image data that can be displayed simultaneously in the external displaying device, and then performs control to output the image data to the external displaying device. According to this configuration, a plurality of images can be displayed simultaneously in an external displaying device having a large screen size such as a television receiver, which is useful when comparing a plurality of images.

[Note 20]

In the image displaying apparatus of the present invention, a configuration is possible in which, when playing back a moving image file, the control portion displays a moving image based on the moving image file in the first display region, and when a capture operation is performed while the moving image file is being played back, the control portion performs control to display the captured still image in the second display region. According to this configuration, capturing can be performed continuously while viewing a captured still image, so operability can be improved.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An image pickup apparatus that comprises a display portion comprising a substantially rectangular display screen including at least two long sides opposed to each other and two short sides opposed to each other, and that is capable of photographing an image having a substantially rectangular first aspect ratio, in which a direction of two short sides of the image are aligned in a vertical direction, in a position in which a direction of the two short sides of the display screen are aligned with the vertical direction, the image pickup apparatus further comprising:
    a control portion that controls a display operation of the display portion,
    wherein the control portion is provided with a first double screen display mode and a second double screen display mode:
    in the first double screen display mode, a first display region and a second display region for two screen images are formed in the display screen, with a direction of the two long sides of the display screen aligned with the vertical direction, the first display region and the second display region do not overlap and are formed such that they are arranged up and down, and the first display region and the second display region have the same aspect ratio as the first aspect ratio;
    and in the second double screen display mode, a third display region and a fourth display region for two screen images are formed in the display screen, with the direction of the two short sides of the display screen aligned with the vertical direction, the third display region and the fourth display region do not overlap and are formed such that they are arranged side by side, and the third display region and the fourth display region have the same aspect ratio as the first aspect ratio.

2. The image pickup apparatus according to claim 1,
    wherein the control portion is capable of reading out image data from a memory unit in which the image data is recorded, and is capable of displaying images based on the image data read out from the memory unit in the first display region and the second display region, respectively, in the first double screen display mode.

3. The image pickup apparatus according to claim 2,
    wherein the control portion activates either one of the first display region and the second display region, and performs control to change the image displayed in an activated display region to an image based on another image data stored in the memory unit, the activated display region being the first display region or the second display region activated by the control portion.

4. The image pickup apparatus according to claim 3,
    wherein, when the image displayed in the activated display region is changed to the image based on other image data stored in the memory unit, the control portion performs control to display an image other than the image displayed in a deactivated display region, the deactivated display region being the first display region or the second display region not activated by the control portion.

5. The image pickup apparatus according to claim 3,
    wherein the control portion accepts an instruction to select either of the first display region and the second display region to activate.

6. The image pickup apparatus according to claim 3,
    wherein, when an instruction to enlarge or reduce an image is input, the control portion changes the image displayed in either one of the first display region and the second display region that is activated to an enlarged or reduced image.

7. The image pickup apparatus according to claim 2,
    wherein the memory unit is capable of storing vertically long image data whose long side direction is matched substantially with the direction of gravity, and
    in the first double screen display mode, the control portion is capable of displaying an image based on the vertically long image data.

8. The image pickup apparatus according to claim 2,
    wherein, in the first double screen display mode, when an instruction to delete image data is input while either of the first display region and the second display region is activated,
    the control portion performs control to delete the image data of the image displayed in an activated display region, the activated display region being the first display region or the second display region activated by the control portion.

9. The image pickup apparatus according to claim 2,
    wherein, in the first double screen display mode, when an instruction to output image data to an external device is input while either of the first display region and the second display region is activated,
    the control portion performs control to output the image data of the image displayed in activated display region to the external device, the activated display region being the first display region or the second display region activated by the control portion.

10. The image pickup apparatus according to claim 2,
    wherein a mark is added to specific image data in the image data recorded in the memory unit, and
    in the first double screen display mode, the control portion performs control to display an image based on the image data to which the mark has been added in one of the first display region and the second display region, and to display an image based on image data to which the mark has not been added in the other of the first display region and the second display region.

11. The image pickup apparatus according to claim 10,
    wherein, when an instruction to set the mark is input while either of the first display region and the second display region is activated, the control portion adds the mark to the image data of the image displayed in an activated display region, and displays an image of the image data to which the mark has been added in a deactivated display region, the activated display region being the first display region or the second display region activated by the control portion and the deactivated display region being the first display region or the second display region not activated by the control portion.

12. The image pickup apparatus according to claim 10, wherein, when an instruction to remove the mark is input while either of the first display region and the second display region is activated and the image data of the image displayed in an activated display region has the mark, the control portion removes the mark of the image data of the image displayed in the activated display region, and displays an image of the image data from which the mark has been removed in a deactivated display region, the activated display region being the first display region or the second display region activated by the control portion and the deactivated display region being the first display region or the second display region not activated by the control portion.

13. The image pickup apparatus according to claim 2, wherein, in the first double screen display mode, when an instruction to enlarge image size is input while both or either of the first display region and the second display region are activated,
the control portion performs control to enlarge the image size of the image displayed in an activated display region, the activated display region being the first display region or the second display region activated by the control portion.

14. The image pickup apparatus according to claim 13, wherein, when enlarging the image size of the image displayed in the activated display region, the control portion is capable of setting a cut-out position to a desired position in the image before the enlarging process.

15. The image pickup apparatus according to claim 2, wherein, in the second first double screen display mode, when an instruction to output image data to an external displaying device is input,
the control portion performs control to convert the image displayed in the first display region and the image displayed in the second display region into image data that can be displayed simultaneously in the external displaying device, and then performs control to output the image data to the external displaying device.

16. The image pickup apparatus according to claim 2, wherein, when playing back a moving image file, the control portion displays a moving image based on the moving image file in the first display region, and
when a capture operation is performed while the moving image file is being played back, the control portion performs control to display the captured still image in the second display region.

17. The image pickup apparatus according to claim 1, wherein the control portion performs control to display an on-screen display within the display regions,
in the first double screen display mode, the on-screen display is displayed with the long side direction of the display screen aligned with the vertical direction.

18. The image pickup apparatus according to claim 17, wherein, in the first double screen display mode, when an instruction to change the storage location of an image file of the image displayed in the display region is input,
the control portion performs control to store the image file into the internal memory when the image file has been stored in the memory medium, and to store the image file into the memory medium when the image file has been stored in the internal memory.

19. The image pickup apparatus according to claim 1, further comprising:
an internal memory capable of storing image data; and
a medium holding unit that removably holds a memory medium capable of storing image data,
wherein, in the first double screen display mode, the control portion performs control to display an image based on the image data stored in the memory medium in one of the first display region and the second display region, and to display an image based on the image data stored in the internal memory in the other of the first display region and the second display region.

20. The image pickup apparatus according to claim 1, further comprising an operation portion comprising;
a first direction operation portion;
a second direction operation portion that enables an operation in a direction opposite to the operation direction operable by the first direction operation portion;
a third direction operation portion that enables an operation in a direction substantially orthogonal to the operation directions operable by the first direction operation portion and the second direction operation portion; and
a fourth direction operation portion that enables an operation in a direction opposite to the operation direction operable by the third direction operation portion,
wherein,
in the first double screen display mode, relative to the display direction of the images displayed in the display screen, the first direction operation portion enables an operation instructing rightward movement, the second direction operation portion enables an operation instructing leftward movement, the third direction operation portion enables an operation instructing upward movement, and the fourth direction operation portion enables an operation instructing downward movement.

21. The image pickup apparatus, according to claim 1, wherein in the first double screen display mode, each of the first display region and the second display region is provided for a separate photographed still or moving image.

22. The image pickup apparatus, according to claim 1, wherein the first aspect ratio is 4:3 or 16:9.

* * * * *